United States Patent
Kamijo et al.

[11] Patent Number: 6,076,128
[45] Date of Patent: Jun. 13, 2000

[54] DATA TRANSFER METHOD BETWEEN BUSES, BRIDGE DEVICES FOR INTERCONNECTING BUSES, AND DATA PROCESSING SYSTEM INCLUDING MULTIPLE BUSES

[75] Inventors: Koichi Kamijo, Yokohama; Ikuo Shoh, Moriyama; Hidenobu Hanami, Shiga-ken, all of Japan

[73] Assignee: International Business Machines Corp., Armonk, N.Y.

[21] Appl. No.: 09/014,450

[22] Filed: Jan. 28, 1998

[51] Int. Cl.[7] .............................. G06F 13/38; G06F 13/40
[52] U.S. Cl. ........................ 710/128; 710/120; 710/126; 710/129
[58] Field of Search .................................... 710/128, 120, 710/126, 129

[56] References Cited

U.S. PATENT DOCUMENTS

| | | | |
|---|---|---|---|
| 5,568,621 | 10/1996 | Wooten | 710/112 |
| 5,621,900 | 4/1997 | Lane et al. | 710/120 |
| 5,737,765 | 4/1998 | Shigeeda | 711/170 |
| 5,748,918 | 5/1998 | Cho et al. | 710/126 |
| 5,781,748 | 7/1998 | Santos et al. | 710/128 |
| 5,864,688 | 1/1999 | Santos et al. | 710/129 |
| 5,878,237 | 3/1999 | Olarig | 710/128 |

*Primary Examiner*—Ayaz R. Sheikh
*Assistant Examiner*—Frantz Blanchard Jean
*Attorney, Agent, or Firm*—Douglas W. Cameron; Anne Vachon Dougherty

[57] ABSTRACT

The object of the present invention is to eliminate, in a data processing system having multiple buses, a combination of devices that can not be accessed via a PCI to PCI bridge. When an access request is issued to an S_ISA device by an S_PCI device, a PCI to PCI bridge determines whether or not a requested address is outside a blocked area, and whether or not the address matches an address stored in a retry register. When the requested address does not match the address in the retry register, the PCI to PCI bridge mistakes the access request for an access to a P_PCI device. Thus, the PCI to PCI bridge positively decodes the access request on the S_PCI bus, and transmits an access request on the P_PCI bus. However, since none of the P_PCI devices do not decode the request, the PCI to PCI bridge has to terminate the bus cycle on the P_PCI bus by master abort. At this time, the PCI to PCI bridge stores the requested address in the retry register, and terminates the bus cycle on the S_PCI bus in the retry manner. Following this, although the S_PCI device tries again to access the S_ISA device, the PCI to PCI bridge refers to the address in the retry register and does not decode the access request. Since none of devices on the S_PCI bus positively decodes the access request, the PCI to ISA bridge subtractively decodes the request. As a result, the access request is transmitted to the S_ISA bus, and the S_ISA device can decode this request, thereby establishing a correct bus cycle.

12 Claims, 12 Drawing Sheets

DATA TRANSFER METHOD BETWEEN BUSES, BRIDGE DEVICES FOR INTERCONNECTING BUSES, AND DATA PROCESSING SYSTEM INCLUDING MULTIPLE BUSES

FIELD OF THE INVENTION

The present invention relates to a method for controlling the data transfer between buses in a data processing system that includes multiple buses, a bridge device for interconnecting buses to enable the data transfer between the buses, and a data processing system for which multiple buses are provided. Particularly, the present invention relates to a method for transferring data between buses in a data processing system, including at least, a first, a second and a third bus, wherein an address within a predetermined address space is assigned for a device on a second bus, and an address outside that space is assigned for devices on the other buses; a bridge device for connecting buses; and a data processing system for which multiple buses are provided. More specifically, the present invention pertains to a method for the data transfer between buses that will adequately process a request for the data transfer from a device on the second bus to a device on another; a bridge device for connecting buses; and a data processing system for which multiple buses are provided.

BACKGROUND OF THE INVENTION

In accordance with recent technical developments, various types of personal computers (PCs), such as desktop, tower and notebook types, have been developed and are being sold on the market. In these PCs, various controller chips, including a host CPU and other components, such as a memory and peripheral devices, are interconnected by a common signal transfer path called a "bus". The bus is implemented in the form of an expansion slot on a system board, and various expansion adapter cards can be loaded into the expansion slot.

The standardization of buses has had a great effect on the computer field. System board makers and expansion adapter card vendors can manufacture and sell products that conform to standard bus specifications, and more users can easily upgrade PCs by expanding their peripheral environments.

Conventionally, the ISA (Industry Standard Architecture), which have been well known, and the specifications for its bus architecture were employed as a standard. The ISA bus, based on a bus adopted for the IBM PC/AT ("PC/AT" is a trademark of IBM Corporation) was designed for the CPU chip 80286 produced by Intel Corp. In its basic configuration, the ISA bus has a bus width of 16 bits, an operating clock of 8 MHz, and a maximum data transfer speed of 4 MBps. The ISA bus is one of the bus architectures which have been most popularly employed, and various expansion boards, peripheral devices and software components (e.g., OS, BIOS, applications) are available that are compatible with it, such that they can be connected and correctly operated on the ISA bus. That is, the ISA is a legacy bus architecture that has inherited much from the past.

Lately, however, powerful CPUs, such as the i486 and the Pentium produced by Intel Corp. and the "PowerPC 6xx" ("PowerPC" is a trademark of IBM Corporation) jointly developed by IBM Corporation and others, whose operating clocks exceed 100 MHz have been developed and are being widely employed. Accordingly, the ISA bus, which has a narrow bus width and a low data transfer speed, cannot adequately accomodate the performance of the high-speed CPU. Further, sub-systems/expansion boards have operated for systems, such as graphics or full motion video sub-systems, SCSI (Small Computer System Interface) storage sub-systems and network systems, for which fast data transfer is required. The data input/output performance of the ISA bus is not adequate for these sub-systems.

In this situation, several bus architectures have been proposed and developed that support the upgraded CPUs and sub-systems. One of these architectures is the PCI (Peripheral Component Interconnect). Originally, the draft specifications for the PCI bus were prepared in 1991 by Intel Corp., and currently, the standardization and the distribution of the PCI bus are being performed by SIG (Special Interest Group) members. In its basic configuration, the PCI bus has a bus width of 32 bits, an operating clock of 33 MHz, and a maximum data transfer speed of 132 MBps. For the PCI, an address and data are multiplexed. An address line and a data line do not have to be separated, so that the number of signals required for the PCI bus is reduced to about half that required for other bus environments, and the number of connection pins required for devices that support the PCI bus connection is also reduced. In addition, for the PCI, the PIO (Programmable I/O transfer) that a CPU performs for the data transfer and the bus master transfer that a device (a master device) on a PCI bus controls when the bus performs the data transfer are defined. Details of the structure of the PCI bus architecture and of its operation are described in "PCI Local Bus Specification, Revision 2.0" (Copyright 1992, 1993) and "PCI to PCI Bridge Architecture Specification, Revision 1.0, 1994" (original issue).

The features of the PCI bus will now be detailed:

Feature (1)

The PCI bus provides a wide bus width and a fast clock, and is positioned as a local bus for a CPU. The PCI bus can be connected, for example, to a video controller for demonstrating a drawing function; to a PCMCIA (Personal Computer Memory Card International Association) controller for performing an interface protocol with a PC card; and to a SCSI expansion board or a LAN (Local Area Network). When a video controller is connected to a PCI bus, for example, the display function of the system can be greatly enhanced.

Among the devices that can be connected to a PCI bus or to an ISA bus, there is a "master" device (or an "initiator" device) for acquiring a bus control right and for transmitting a command to perform processing without the involvement of any other device (e.g., a CPU). Furthermore, on the bus there is a device called a "slave" device (or a "target" device) that accepts a command, i.e. a request from the master. Most of the devices connected to the bus serve either as a master or as a slave, depending on the actual situation.

According to the PCI protocol, for example, the PCI master declares the initiation of a transaction by asserting a "frame" signal (FRAME#). The PCI slave is constrained to respond to the PCI master within a predetermined period of time. In other words, the PCI slave interprets an address transmitted to the PCI bus (the "address" here including both an I/O address and a memory address). When the PCI slave understands it is designated as a transaction target, the PCI slave requests a bus cycle by asserting a "device selection" signal (DEVSEL#) at a predetermined timing. That is, when the PCI master requests a transaction by asserting a frame signal and the PCI slave responds to it positively by asserting a device selection signal, a PCI bus cycle is established accordingly. When a device selection signal is not received from the PCI slave within a predetermined period, the PCI master can do nothing but execute a master abort (halting) and forcibly terminate the bus cycle.

In the PCI bus protocol, three timings, i.e. the third PCI bus clock (Fast), the fourth clock (Medium) and fifth clock (Slow), are specified as "predetermined timings" at which the PCI slave asserts a device selection signal after the assertion of a frame signal (see FIG. 11). The method whereby the slave interprets an address on the address lines and sends a positive response is called "Positive Decoding". A device that employs the positive decoding method is sometimes called a "positive device".

The PCI bus protocol also defines a decoding method called "Subtractive Decoding" as a special operation other than the positive decoding. Subtractive decoding is an address interpretation method whereby, only when a device selection signal is not asserted at any of the Fast, Medium or Slow timings, i.e. , only when no positive devices on the PCI bus respond to the request, the device acknowledges that it is a designated slave device, and the slave device asserts a device selection signal at a clock timing next to Slow (see FIG. 11). The device for employing the subtractive decoding is sometimes called a "subtractive device". In the PCI bus architecture, only one subtractive device can exist on a single PCI bus.

Feature (2)

The second feature of the PCI is that the connection to the other bus is allowed by providing between them a bridge chip that is a bus cycle converter. For example, a PCI bus and an ISA bus can be interconnected through a PCI to ISA bridge, and two PCI buses can be interconnected through a PCI to PCI bridge. When a bridge circuit (a host to PCI bridge) is provided between the CPU and the PCI bus, not only a specific CPU type (e.g., x86 CPU of Intel Corp.) but also another CPU type (e.g., "PowerPC" of IBM Corporation and others) can be employed.

Many current PCs adopt a multiple bus architecture that employs, as a local bus, a PCI bus having a high input/output capability and uses, as an expansion bus, an ISA bus that operates in accordance with a relatively slow peripheral device. The PCI bus and the ISA bus are interconnected through a PCI to ISA bridge. As a result, the rich ISA legacy can be inherited, while the fast input/output function of the PCI can be utilized.

The buses interconnected through a bridge are driven independently, i.e., asynchronously. Even when multiple devices are connected to a single PCI bus, no loads are applied to the other bus, so that the PCI bus is superior in its electric characteristic and its stability. The number of devices that can be connected can be increased by extending a bus using a bridge circuit.

Generally, a connection portion of a bridge circuit close to a CPU (i.e., a host) is called the primary, and a connection portion on the opposite side is called the secondary. The bridge circuit is also regarded as one of the devices on the PCI bus, and the main role of the bridge circuit is the conversion of a bus cycle between the primary bus and the secondary bus. More specifically, when a bus transaction request is issued by a device on the primary bus (hereinafter referred to as a "primary device") to a device on the secondary bus (hereinafter referred to as a "secondary device"), the primary bus side acts for the secondary bus to respond positively, and the secondary bus side acts for the primary device to initiate a bus transaction on the secondary bus. When the secondary device issues the bus transaction, the secondary bus side acts for the primary device to respond positively, and the primary bus side acts for the secondary device to initiate the bus transaction on the primary bus.

The PCI to PCI bridge is a chip for two connecting PCI buses, as was previously described. The specifications for the PCI to PCI bridge are provided in "PCI to PCI BRIDGE ARCHITECTURE SPECIFICATION Revision 1.0." According to the specifications, the PCI to PCI bridge supports a "Memory/IO Base/Limit Register" function. This is because a usable memory address space and an I/O address space are partitioned by the primary PCI device and the secondary PCI device so that devices on the respective PCI buses can be accessed specifically. For example, when an access request is issued on the primary PCI bus, this is initiated on the secondary PCI bus only when a designated address is within the address space assigned to the secondary PCI device, and access to the other address is blocked by the PCI to PCI bridge. When an access request is issued on the secondary PCI bus, this is initiated on the primary PCI bus only when a designated address is outside an address space assigned to the secondary PCI device, and access to the other address is blocked by the PCI to PCI bridge.

In FIG. 12, the "Memory/IO Base/Limit Register" function (hereinafter referred to as a "block function") of the PCI to PCI bridge is schematically shown by using an I/O address map. A shaded space, i.e., an I/O address space (hereinafter referred to as a "blocked area") that is partitioned by using an I/O base address and an I/O limit address, is dedicatedly employed by the secondary PCI device. The primary PCI device employs only the other I/O address space. The PCI to PCI bridge has a register for storing the base address and the limit address to set a blocked area. On the other hand, although the ISA device is not a PnP compliance (which will be described later), addresses to be used for several device types are traditionally determined. For example, expansion adaptor cards loaded into ISA bus slots #1 and #2 respectively employ I/O address areas of '800'h to '807'h and '300'h to '305'h, and a serial port and a parallel port respectively employ I/O address areas of '3E8'h to '3EF'h and '778'h to '77A'h. The blocked areas are determined by avoiding these addresses that the ISA devices use.

The PCI to PCI bridge generally supports the previously described subtractive decoding on the primary PCI bus, while taking into account a downstream process, i.e., a data transfer from a master on the primary side to a slave on the secondary side. The subtractive PCI to PCI bridge positively responds to an access request to a PCI device, and subtractively operates when no PCI devices have asserted a device selection signal within a predetermined period of time.

The PCI to PCI bridge that supports the block function and the subtractive decoding operation responds positively to an access request from the primary PCI device to an address within the blocked area, and gives the target secondary PCI device a chance to acquire the bus cycle. A PCI to PCI bridge of this type responds positively to an access request from the secondary PCI device to the primary PCI device which uses an address outside the blocked area, and gives the target primary PCI device a chance to acquire the bus cycle. This PCI to PCI bridge also subtractively responds to an access request to the ISA device which uses an address outside the blocked area, and thus implements a bridge to the ISA bus (the secondary ISA bus) connected to the secondary PCI bus. Although not shown, for a memory address, the PCI to PCI bridge implements the block function in the same manner.

Feature (3)

Another feature of the PCI corresponds to PnP (Plug and Play). PnP is a function of a computer system for automatically recognizing its peripheral environment. In a PnP system, even when the number and types of devices of the system are dynamically changed, for example, by inserting an expansion board into an expansion slot, a complicated operation, such as the setting of a dip switch, is not required, and the whole system can be used. This is because, in a PnP system, "system resources", such as a DMA level, an IRQ level, an I/O address and a memory address, are automatically allocated for new, expansion devices, and system resources that were used by a removed device are released automatically. In other words, the system can automatically identify an address used by a PnP PCI device.

Most ISA devices, which are connected to an ISA bus, do not comply with PnP, and the system cannot identify the addresses that the ISA devices employ. When, for example, a non-PnP expansion adaptor card is inserted into an ISA bus slot, the PCI to ISA bridge that connects a PCI bus and the ISA bus cannot identify an address used by the expansion adaptor card. Accordingly, even when an access request to a non-PnP ISA device is issued on the PCI bus, the address used by the ISA device is unknown, so that the PCI to ISA bridge cannot respond positively to this request. For this reason, there is a tendency for PCI to ISA bridges to be designed as subtractive devices. Only when a device selection signal is not asserted on the PCI bus within a predetermined period of time (i.e., positively), does a subtractive PCI to ISA bridge assert a device selection signal itself, and transmit an access request to the ISA bus. In other words, only when none of the PnP PCI devices request a bus cycle, can the ISA device (e.g., an expansion adaptor card that is added), the address of which cannot be identified by the system, acquire a bus cycle.

Transaction on PCI bus

An explanation has been given that the PCI bus architecture permits the interconnection of a PCI bus with another bus through a bridge chip, and that most current PCs adopt a multiple bus architecture that permits the coexistence of a PCI bus and a ISA bus. Therefore, the hardware arrangement for a PC is as specifically shown in FIG. 13.

In FIG. 13, three independent bus environments, a primary PCI bus, a secondary PCI bus and an ISA bus, are provided as PC hardware. The prefixes, "primary" and "secondary," for the two PCI buses merely express the distance from the host CPU. The PCI buses are connected by a PCI to PCI bridge chip. Various PCI devices having the PCI protocol are connected to the PCI buses.

ISA buses are connected to the respective PCI buses through PCI to ISA bridge chips. In this specification, the ISA bus connected to the primary PCI bus is called a primary ISA bus, and the ISA bus connected to the secondary PCI bus is called a secondary ISA bus. ISA devices having the ISA protocol are connected to the ISA buses.

The secondary PCI bus may be incorporated on the primary PCI bus side, i.e., accommodated into the system main body, or may be developed in a docking station for a notebook PC (see the specification for Japanese Patent Application No. Hei 8-31699 assigned to the present applicant.

In the multiple bus environment shown in FIG. 13, at least the five bus transactions shown in Table 1, below, must be supported.

TABLE 1

| Master | Slave |
| --- | --- |
| Primary PCI device | Secondary PCI device |
| Primary PCI device | Secondary ISA device |
| Secondary PCI device | Primary PCI device |
| Secondary PCI device | Secondary PCI device |
| Secondary PCI device | Secondary ISA device |

First, when a device on the primary PCI bus, i.e., a "primary PCI device", sends a request to access a device on the secondary PCI bus, i.e., a "secondary PCI device", the PCI to PCI bridge circuit acts for the secondary PCI device to respond positively to the request, and also initiates the access request on the secondary PCI bus. Then, when the secondary PCI device acknowledges this request, a bus cycle is established.

When the primary PCI device sends a request to access a device on the secondary ISA bus, i.e., a "secondary ISA device", the PCI to PCI bridge circuit subtractively responds to it, and the secondary PCI to ISA bridge circuit subtractively responds to it, so that the access request is transmitted to the ISA bus. As a result, the secondary ISA device can be accessed.

When the secondary PCI device sends a request to access the primary PCI device, the PCI to PCI bridge circuit acts for the primary PCI device to respond positively to the request, and also initiates the request on the primary PCI bus. Then, when the primary PCI device acknowledges this request, a bus cycle is established.

Further, when the secondary PCI device sends a request to access a secondary PCI device, a bus cycle is established directly on the secondary PCI bus. At this time, the PCI to PCI bridge blocks the access request and does not initiate the request on the primary PCI bus.

The above four bus transactions are supported relatively easily by the conventional PnP function of the PCI, i.e., by the PCI to PCI bridge which can identify addresses that all the PCI devices use.

On the other hand, it is not easy to implement the fifth bus transaction in Table 1, i.e., to access the secondary ISA device from the secondary PCI device. Since an address that an ISA device uses is outside the address space assigned to the secondary PCI device (see FIG. 12), the PCI to PCI bridge does not block an access request to the ISA device. As a result, the PCI to PCI bridge positively (i.e., "Fast") requests a bus cycle, and a subtractive secondary PCI to ISA device misses an opportunity for acknowledgement.

This condition will now be described while referring to a timing chart in FIG. 14. In FIG. 14, prefix "P__" represents a signal line of the primary PCI bus, and prefix "S__" represents a signal line of the secondary PCI bus (this applies hereinafter). A superscript "*" suffix identifies a signal that is asserted by a PCI to PCI bridge.

A bus cycle is begun when the secondary PCI device asserts a frame signal (S_FRAME#) and starts a transaction. The secondary PCI device transmits an address across the address/data signal line (S_AD [31:0]) and a command across command/byte enable signal line (S_C/BE# [3:0]). In addition, the secondary PCI device asserts an initiator ready signal (S_IRDY#) to indicate data transfer is ready, and also transmits data across the address/data signal line (S_AD [31:0]) and a byte enable value across the command/byte enable signal line (S_C/BE# [3:0]).

At this time, the address transmitted across the signal line S_AD [31:0] is outside the address space assigned only to the secondary PCI devices (i.e. blocked area) defined by the "Base/Limit Register" of the PCI to PCI bridge. Therefore, the PCI to PCI bridge mistakenly regards the access request as access to the primary PCI device, and on the second PCI bus, a device selection signal (S__DEVSEL#) is positively asserted as a target. As a result, the subtractive secondary PCI to ISA bridge misses an opportunity to acquire a bus cycle.

When a predetermined delay time has elapsed, the PCI to PCI bridge asserts a frame selection signal (P__FRAME#) and transmits the same address across address/data signal line (P__AD [31:0]) and the same command across command/byte enable signal line (P__C/BE [3:0]), so that the PCI to PCI bridge serves as a master device and develops the same bus transaction on the primary PCI bus as was developed for the secondary PCI bus. Furthermore, the PCI to PCI bridge asserts an initiator ready signal (P__IRDY#) and transmits the same data across the address/data signal line (P__AD [31:0]) and the same byte enable value across the command/byte enable signal line (P__C/BE# [3:0]).

However, since a device that hits a designated address does not exist on the primary PCI bus, a device selection signal (P__DEVSEL#) is not asserted for any of the Fast, Medium, Slow and subtractive timings. As a result, after a predetermined time has elapsed, the PCI to PCI bridge negates the initiator ready signal (P__IRDY#) and has to "master abort" the bus cycle on the primary PCI bus. On the secondary PCI bus, a stop signal (S__STOP#) is asserted and the bus cycle has to be "target aborted."

That is, the secondary ISA device cannot obtain a bus cycle and accordingly, data can not be transmitted eternally. If a device that cannot be accessed is present in the system, an abnormal system operation, i.e., system hang-up, tends to occur. This is also a very serious problem in setting the standard protocol for the PCI to PCI bridge.

This problem derives from the fact that among the secondary PCI devices only the secondary PCI to ISA bridge must acknowledge an access to the address outside the blocked area. A relatively easy countermeasure for this problem is for the system to recognize all the addresses that the ISA devices employ. For example, a register for storing all the addresses that are assigned to the respective secondary ISA devices may be additionally provided for the PCI to PCI bridge, or the PnP function for the ISA device may be supported by software.

In the former case, however, a large number of registers must be added to the PCI to PCI bridge, and accordingly, the number of gates and the chip area are increased, which results in a rise in the manufacturing costs. In the latter case, since none of the software programs that is currently used supports the secondary ISA device, and the ISA device cannot manage addresses unless it is PnP compatible, technically, implementation is practically impossible.

It is to be noted that, in the foregoing description, and in the ensuing detailed description of the invention, the protocol for the PCI bus and the definitions for the respective signal lines are well known to one having ordinary skill in the art. For the sake of completeness, the meanings of the signal lines, etc., will be briefly explained, so that the contents shown in the timing charts in FIGS. 11 and 14 can be easily understood.

i) A FRAME# (Frame signal) is a signal for indicating to a slave device (a target) that a master device (an initiator) is going to start a transaction, and is asserted by the master device.

ii) An IRDY# (Initiator Ready signal) is a signal for indicating that a master device is ready for data transfer, and is asserted by the master device.

iii) A DEVSEL# (Device Selection signal) is a signal for indicating to a master device that a slave device becomes aware of being selected as a target, and is asserted by a slave device that decoded an address. In other words, DEVSEL# is a signal indicating that the slave device is requesting a bus cycle.

iv) A TRDY# (Target Ready signal) is a signal for indicating that a slave device is ready for data transfer, and is asserted by the slave device.

v) A STOP# (Stop signal) is a signal for indicating to a master device that a slave device can not process a transaction, and is asserted by the slave device.

vi) A Master abort is defined as an operation whereby the master device halts (abnormally terminates) a transaction under the process. A master abort is used when there is no device on the bus that can serve as a target to acknowledge a transaction, i.e., when DEVSEL# is maintained in the negated state for more than a predetermined time period. The master abort is affected by the master device negating IRDY#.

vii) A Target abort is defined as an operation whereby a slave device halts (abnormally terminates) a transaction under the process, and is employed when an access that the slave device can not handle is performed. A target abort is reported to the master device by a STOP# being asserted by the slave device, while negating DEVSEL# and TRDY#.

viii) A Retry is defined as an operation whereby a slave device halts a transaction under the process, and is used when the slave device temporarily can not accept an access. While a target abort means there is a complete access halt, a retry means that the master device can retry the transaction. The slave device can notify the master device of a retry by asserting STOP# while asserting DEVSEL#.

To overcome the above problems, it is one object of the present invention to provide a superior method, for controlling the data transfer between buses in a data processing system that includes a plurality of buses, a superior bridge device for interconnecting buses to enable the data transfer between buses, and a superior data processing system for which a plurality of buses are provided.

It is another object of the present invention to provide a superior method for the data transfer between buses in a data processing system, which includes, at the least, a first, a second and a third bus and which assigns an address within a predetermined address space for a device on the second bus and assigns an address outside the predetermined address space for devices on the other buses; a superior bridge device for connecting buses; and a superior data processing system for which a plurality of buses are provided.

It is an additional object of the present invention to provide a superior method for the data transfer between buses, whereby a combination of devices that cannot be accessed by means of a PCI to PCI bridge is eliminated; a bridge device for connecting buses; and a data processing system for which a plurality of buses are provided.

It is a further object of the present invention to provide a superior method for the data transfer between buses, whereby, in a data processing system having a bus environment wherein a PCI bus and an ISA bus coexist, a bus master on a specific bus can access a bus slave, a bridge device for connecting buses, and a data processing system for which a plurality of buses are provided.

It is a still further object of the present invention to provide a superior method for the data transfer between buses, whereby a master device on a PCI bus can appropriately access a subtractive slave device in a data processing system including a PCI bus that is interconnected with another PCI bus through a PCI to PCI bridge, an ISA bus and a subtractive PCI to ISA bridge for interconnecting a PCI bus with an ISA bus; a superior bridge device for connecting buses; and a superior data processing system for which a plurality of buses are provided.

SUMMARY OF THE INVENTION

To achieve the above objects, according to a first aspect of the present invention, a method is provided for transferring data between buses, in a data processing system that has a first bus, a second bus interconnected with the first bus through a first bridge device, and a third bus interconnected with the second bus through a second bridge device, with devices on the second bus using addresses within a predetermined address space and devices on the other buses using addresses outside the predetermined address space. The method comprises the steps of: (a) a device on the second bus issuing a request to access a device on the third bus; (b) the first bridge device acknowledging and transmitting the access request to the first bus; (c) the first bridge device, when no acknowledgement of the access request is issued by any device on the first bus, storing an address of a device to be accessed and terminating the access request; (d) the device on the second bus retrying the access request; (e) the first bridge device not acknowledging the access request when an address of a device to be accessed is the same as the stored address; and (f) the second bridge device, when no acknowledgement of the access request is issued by any device on the second bus, acknowledging and transmitting the access request to the third bus.

According to a second aspect of the present invention, a method is provided for transferring data between buses, in a data processing system that includes a primary PCI bus serving as a local bus for a host CPU, a secondary PCI bus interconnected with the primary PCI bus through a PCI to PCI bridge, and a secondary ISA bus interconnected with the secondary PCI bus through a PCI to ISA bridge, a secondary PCI device on the secondary PCI bus using an address within a predetermined address space and a primary PCI device on the primary PCI bus and a secondary ISA device on the secondary ISA bus using addresses outside the predetermined address space. The method comprises the steps of: (a) a secondary PCI device asserting a frame signal for the secondary PCI bus to initiate an access request for the secondary ISA device; (b) the PCI to PCI bridge asserting a device selection signal among the secondary PCI bus to acknowledge the access request, and initiating the access request on the primary PCI bus; (c) the PCI to PCI bridge storing a requested address and terminating the access request when no primary PCI device asserts a device selection signal on the primary PCI bus within a predetermined period of time; (d) the secondary PCI device terminating the access request by a retry; (e) the PCI to PCI bridge not asserting a device selection signal on the secondary PCI bus when the requested address is the same as the stored address; and (f) the PCI to ISA bridge asserting a device selection signal on the secondary PCI bus to acknowledge the access request and initiating the access request on the secondary ISA bus.

In the second aspect of the invention, it is preferable that at the step (b), the PCI to PCI bridge positively asserts a device selection signal on the secondary PCI bus. It is also preferable that at the step (c), the PCI to PCI bridge terminates a bus cycle by a master abort on the primary PCI bus, and terminates bus cycle by a retry on the secondary PCI bus. It is also preferable that at the step (f), the PCI to ISA bridge subtractively asserts a device selection signal on the secondary PCI bus.

According to a third aspect of the present invention, a method is provided for transferring data between buses, in a data processing system that includes a primary PCI bus serving as a local bus of a host CPU and a secondary PCI bus interconnected with the primary PCI bus through a PCI to PCI bridge, a positive secondary PCI device on the secondary PCI bus using an address within a predetermined address space, and a primary PCI device on the primary PCI bus and a subtractive secondary PCI device using addresses outside the predetermined address space. The method comprises the steps of: (a) a first secondary PCI device asserting a frame signal for the secondary PCI bus to initiate an access request for a second secondary PCI device; (b) the PCI to PCI bridge positively asserting a device selection signal on the secondary PCI bus, and initiating the access request on the primary PCI bus; (c) the PCI to PCI bridge, when no PCI device on the primary PCI bus asserts a device selection signal on the primary PCI bus within a predetermined period of time, storing a requested address and terminating a transaction on the secondary PCI bus in RETRY manner; (d) the first secondary PCI device, in response to the RETRY, retrying the access request; (e) the PCI to PCI bridge, when the requested address is the same as the stored address, not positively asserting a device selection signal on the secondary PCI bus; and (f) the second secondary PCI device subtractively asserting a device selection signal on the secondary PCI bus when none of the other secondary PCI devices positively asserts a device selection signal.

According to a fourth aspect of the present invention, a bridge device for interconnecting a primary PCI bus is provided, which serves as a local bus for a host CPU, and a secondary PCI bus, includes storage means for storing address data for a bus cycle that the bridge device has terminated by RETRY.

According to a fifth aspect of the present invention, a bridge device for interconnecting a primary PCI bus is provided, which serves as a local bus for a host CPU, and a secondary PCI bus, includes storage means for storing address data for a bus cycle that the bridge device has terminated by a RETRY; and decoding means for not acknowledging a bus cycle for designating the address stored in the storage means.

According to a sixth aspect of the present invention, a bridge device for interconnecting a primary PCI bus that serves as a local bus for a host CPU and a secondary PCI bus is provided which comprises: (a) first storing means for storing an address space that only a secondary PCI device connected to the secondary PCI bus is allowed to use; (b) second storing means for storing address information of a bus cycle that the bridge device itself terminated in a RETRY manner; (c) primary decoding means for decoding an address hit when a requested address is within the address space defined by the first storing means; (d) first transmitting means for, in response to the address hit decoded by the primary decoding means, transmitting a bus cycle on the primary PCI bus to the secondary PCI bus; (e) secondary decoding means for decoding an address hit only when a requested address is outside the address space defined by the first storing means and that does not exist in the second storing means; and (f) second transmitting means for, in response to the address hit decoded by the secondary decoding means, transmitting a bus cycle on the secondary PCI bus to the primary PCI bus.

In the sixth aspect of the invention, it is preferable that the primary decoding means subtractively decode an address hit and the secondary decoding means positively decode an address hit.

According to a seventh aspect of the present invention, a data processing system is provided having multiple buses which comprises: (a) a main processor for totally controlling and managing the operation of the system; (b) a main memory; (c) a first bus provided as a local bus for the main processor; (d) at least one first device connected to the first bus; (e) a second bus; (f) a bridge for interconnecting the first and the second buses and for, when the bridge terminates a bus cycle in a RETRY manner, not requesting the bus cycle; and (g) at least one second device connected to the second bus.

According to an eighth aspect of the present invention, a data processing system having multiple buses is provided which comprises: (a) a main processor for totally controlling and managing the operation of the system; (b) a main memory; (c) a primary PCI bus provided as a local bus for the main processor; (d) at least one primary PCI device connected to the primary PCI bus; (e) a secondary PCI bus; (f) a PCI to PCI bridge, for interconnecting the secondary PCI bus with the primary PCI bus, including decoding means for positively decoding on the secondary PCI bus and decode inhibiting means for, when the PCI to PCI bus terminates a bus cycle in a RETRY manner, inhibiting decoding of the bus cycle that was retried; (g) at least one positive decoding secondary PCI device connected to the secondary PCI bus; and (h) one subtractive decoding secondary PCI device connected to the secondary PCI bus.

In the eighth aspect of the invention, the subtractive decoding secondary PCI device (h) may be a PCI to ISA bridge for connecting an ISA bus to the secondary PCI bus.

In accordance with the hardware arrangement of a computer system that preferably accomplishes the present invention, in a multiple bus environment where there are provided a primary PCI bus serving as a local bus for a host CPU, a secondary PCI bus connected to the primary PCI bus through a PCI to PCI bridge and a secondary ISA bus connected to the secondary PCI bus through a PCI to ISA bridge, PCI devices and ISA devices are connected to the PCI bus and the ISA bus. In addition, it is preferable that the PCI to PCI bridge support the block function and the subtractive operation, and that the PCI to ISA bridge support the subtractive operation.

In the computer system of the present invention, assume that a PCI bus cycle is initiated while the secondary PCI device is a master and the secondary ISA device is a slave. The PCI to PCI bridge determines whether a requested address is outside a blocked address space. If the address is outside the blocked address space, the PCI to PCI bridge then determines whether the address matches an address stored in a "retry register", which is the second storing means.

When the requested address does not match an address in the retry register, the PCI to PCI bridge ascertains that the access to the primary PCI device is requested. Accordingly, the PCI to PCI bridge positively acknowledges the access request on the secondary PCI bus, and transmits it to the primary PCI bus.

However, since actually the request is one for accessing the secondary ISA device and none of the primary PCI devices acknowledge the request, the PCI to PCI bridge has to terminate the bus cycle on the primary PCI bus by a master abort. At this time, the PCI to PCI bridge stores the requested address in its retry register, and terminates the bus cycle on the secondary PCI bus in the RETRY manner, not in the target abort manner.

Following this, in response to the retry, the secondary PCI device again issues the access request to the secondary ISA device. Since the requested address matches the address stored in the retry register, the PCI to PCI bridge does not acknowledge the access request on the secondary PCI bus. Thus, the access request is not transmitted to the primary PCI bus.

Since none of the positive devices on the secondary PCI bus acknowledge the access request, the PCI to ISA bridge can subtractively acknowledge the access request. The PCI to ISA bridge transmits the access request to the secondary ISA bus, and the secondary ISA device for which access was requested acknowledges the transmitted access request, thereby establishing a correct bus cycle.

That is, according to the present invention, when any type of device is connected to the secondary side of the PCI to PCI bridge, a PCI bus cycle can be correctly terminated. This operation can be implemented by the cooperative response of the RETRY, which is one of the PCI protocols, and a retry register that is mounted in the PCI to PCI bridge.

In addition, according to the present invention, data can be transferred correctly from the secondary PCI device to the secondary ISA device without placing any load on a software design. It should be understood that the present invention is very effective for the standardization of a subtractive decoding PCI to PCI bridge.

BRIEF DESCRIPTION OF THE DRAWINGS

The other objects, features, and advantages of the present invention will become apparent during the course of the detailed description of the embodiment of the present invention, which will be given while referring to the accompanying drawings wherein.

DESCRIPTION OF THE PREFERRED EMBODIMENT

Figure 1:
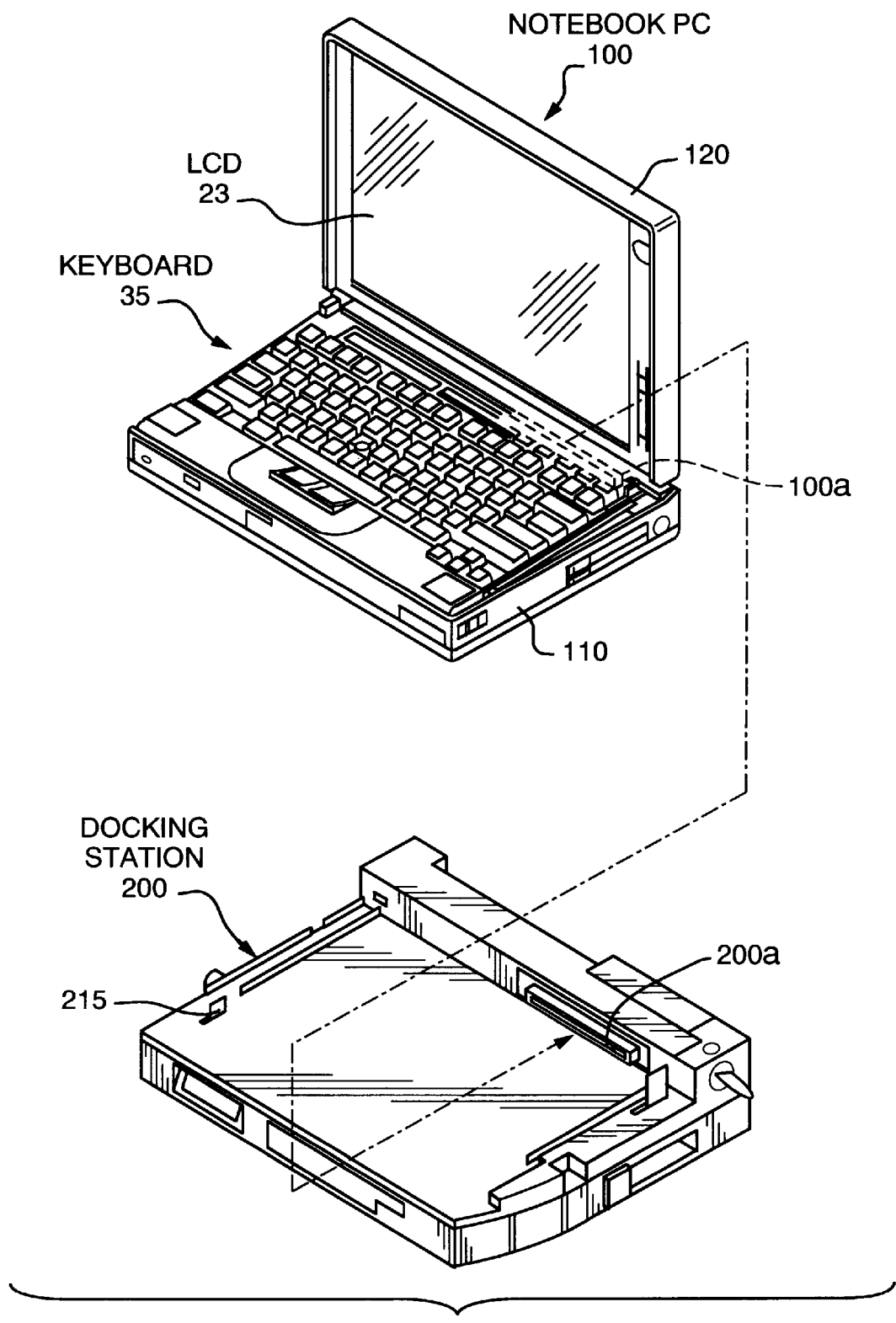
FIG. 1 is a diagram illustrating the outline arrangement of a specific personal computer (PC) 100 that is adequate for the present invention.

In FIG. 1 is shown the outline structure of a typical personal computer (PC) 100 that can adequately accomplish the present invention. The PC 100 illustrated therein is a light and portable notebook computer, but it is to be understood that other computers can appropriately implement the present invention. This type of PC is a so-called "clam shell" structure that comprises a system main body 110 and a lid 120 that pivots at almost the rear edge of the main body 110. The system main body 110 incorporates a system board (not shown) on which a CPU and a memory chip are mounted, and external storage devices (not shown), such as an HDD (hard disk drive), an FDD (floppy disk drive) and a CD-ROM drive. A keyboard unit 35 is provided on the top of the main body 110. A liquid crystal display (LCD) unit 23 is provided in the lid 120. Input at the keyboard 35 and viewing the LCD display screen is possible by opening the clam shell. When the clam shell is closed, the top face of the keyboard 35 and the display screen of the LCD 23 are stored internally, so that the computer can easily be stored or carried.

A function expansion unit 200, generally called a "docking station", is prepared for the notebook PC 100 of this type. The docking station 200 has an almost flat shape, with one part of the top surface serving as an installation face on which the notebook PC 100 is mounted. The mounted notebook PC 100 and the docking station 200 are connected together electrically through connectors 100A and 200A, and electric signals can be exchanged between these connectors. This type of docking station 200 commonly provides a "port function" and a "bus expansion function". The port function provides, for the PC 100, ports for the cable connection of external peripheral devices, such as an external mouse/keyboard, an external CRT display and an external FDD. The bus expansion function provides for an expansion of the bus (e.g., a PCI bus or an ISA bus) in the PC 100 to the several devices to be connected to the bus or to the several expansion slots.

While the docking station 200 is not directly related to the subject of the present invention, it should be understood that the secondary PCI bus may be provided by the docking station 200. For details concerning the docking station, reference is made to the specification for Japanese Patent Application No. Hei 8-31699, for example, which is assigned to the present applicant, the teaching of which are hereby incorporated by reference. The computer employed for implementation of the present invention is not necessarily a notebook computer but may be another type (e.g., a desktop, tower or laptop).

The hardware arrangement of a computer system embodying the present invention provides a multiple bus environment wherein are provided a primary PCI bus that serves as a local bus for a host CPU, a secondary PCI bus connected to the primary PCI bus through a PCI to PCI bridge, and a secondary ISA bus connected to the secondary PCI bus through a PCI to ISA bridge. Normally, one or more PCI devices and ISA devices are connected to the PCI buses and the ISA bus. In addition, it is preferable that the PCI to PCI bridge support the "Memory/IO Base/Limit Register" function (the "block function" previously described) and the subtractive decoding function.

Figure 2:
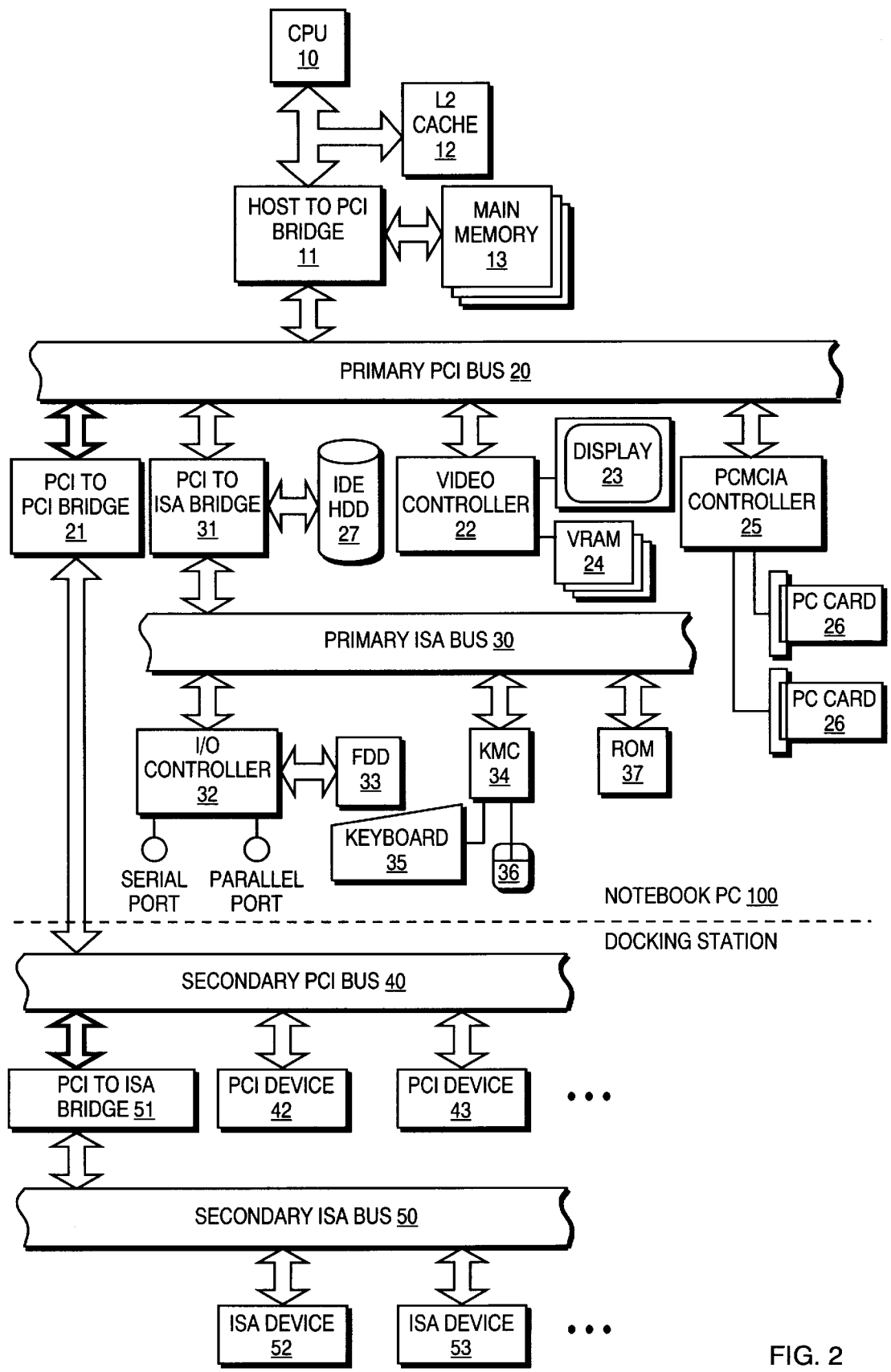
FIG. 2 is a schematic diagram illustrating the internal hardware arrangement of the personal computer (PC) 100 according to the present invention.

FIG. 2 is a schematic diagram illustrating the hardware arrangement of the personal computer (PC) 100 embodying the present invention. The respective sections will now be described. PCI devices connected to PCI buses, indicated by bidirectional arrows which are painted black, are designed for subtractive decoding relative to the PCI buses.

A CPU 10, which is the main controller for the system 100, executes various programs under the control of an operating system (OS). The CPU 10, for example, can be "Pentium/1xx MHz," produced by Intel Corp., or a "PowerPC 6xx," jointly developed by IBM Corporation and others. The OS, for example, can be "OS/2" from IBM Corporation ("OS/2" is a trademark of IBM Corporation), or "Windows95" from Microsoft Corp.

External pins on the CPU 10 are connected to a primary PCI bus 20 through a host to PCI bridge 11. The primary PCI bus 20 is interconnected with a secondary PCI bus 40 through a PCI to PCI bridge 21, and is also interconnected with a primary ISA bus 30 through a primary PCI to ISA bridge 31. Further, the secondary PCI bus 40, is interconnected with a secondary ISA bus 50 through a secondary PCI to ISA bridge 51. In other words, the system 100 is a multiple bus structure including the PCI buses 20 and 40 and the ISA buses 30 and 50. The basic functions and the features of the PCI and ISA buses were described previously in the Background section.

The host to PCI bridge 11 in this embodiment has a memory controller for controlling the access to a main memory 13, and a data buffer for absorbing the difference in speed between the CPU 10 and the PCI bus 20. The main memory 13, a programmable storage device that is used for loading programs (the OS or applications) executed by the CPU 10 and for the temporary storage of work data, generally consists of a plurality of DRAM chips. In addition to this, semiconductor memory devices, such as an L2 (Level2 cache) 12 and a ROM 37, are included in the system 100. The L2 cache 12 is a high speed memory in which part of the code and data frequently accessed are temporarily stored, and is employed when the CPU 10 absorbs the time difference for accessing the main memory 13. An SRAM chip is normally used as the L2 cache 12. The ROM 37 is a read only memory in which are permanently stored a test program (POST) that is executed when the power is turned on, a code group (BIOS) for using hardware to operate the devices in the system 100, and data required for system security.

The PCI to PCI bridge 21, a video controller 22, a PCMCIA controller 25 and the primary PCI to ISA bridge 31, all of which are primary PCI devices, are connected to the primary PCI bus 20. The PCI to PCI bridge 21 is a chip for interconnecting the primary PCI bus 20 with the secondary PCI bus 40. The PCI to PCI bridge 21 conforms to the "PCI to PCI BRIDGE ARCHITECTURE SPECIFICATION Revision 1.0" (previously described), and includes the structure and operational characteristics inherent to this embodiment. The details will be described below.

The video controller 22 is a peripheral controller chip for actually processing an image drawing command issued by the CPU 10. The video controller 22 writes processed image data in a screen buffer (VRAM) 24, and then reads it from the VRAM 24 and outputs it to the display 23.

The PCMCIA controller 25 is a dedicated controller chip for directly connecting a signal line on the PCI bus 20 to a PC card slot. A PC card 26, which conforms to the specification (e.g., "PC Card Specification 95") that is prepared by the PCMCIA (Personal Computer Memory Card International Association)/JEIDA (Japan Electronic Industry Development Association), can be dynamically inserted into or removed from the card slot.

The primary PCI to ISA bridge 31 is a chip for interconnecting the primary PCI bus 20 with the primary ISA bus 30, and develops a transaction on one bus onto another bus, as needed. The PCI to ISA bridge 31 in this embodiment includes the functions of a DMA controller, a programmable interrupt controller (PIC) and a programmable interval timer (PIT). In addition, the PCI to ISA bridge 31 has an IDE interface that conforms to the IDE (Integrated Drive Electronics) standard. External memory devices, such as an IDE hard disk drive (HDD) 27 and an IDE CD-ROM, are connected to the IDE interface.

The PCI to PCI bridge 21 in this embodiment is designed for subtractive decoding on the primary PCI bus 20 in order to adequately accomplish the present invention, which will be described later. Accordingly, the primary PCI to ISA bridge 31 has to adopt the positive decoding system. However, since the respective ISA devices on the primary ISA bus 30 are equipped as standard features and since the PCI to ISA bridge 31 knows in advance the system resources available for all the primary ISA devices, the PCI to ISA bridge 31 can provide a positive decoding operation.

An I/O controller 32 and a keyboard (KBD)/mouse controller (KMC) 34, which are primary ISA devices, are connected to the primary ISA bus 32. The I/O controller 32 is a peripheral controller chip for performing serial or parallel data transfer with an external device through a serial port or a parallel port. Generally, a modem (not shown) is connected to the serial port, while a printer (not shown) is connected to the parallel port. It should be noted that the I/O controller 32 in this embodiment also controls a floppy disk drive (FDD) 33. The KMC 34 is a peripheral controller chip that fetches, as computer data, input code at the keyboard 35 and input coordinate values by the mouse 36, and transmits the data to the bus 30.

The CPU 10, the primary PCI devices, and the primary ISA devices described above are provided, for example, as a host system in a notebook computer. The secondary PCI bus 40 and the secondary ISA bus 50, and the secondary PCI devices 42, 43, . . . and the secondary ISA devices 52, 53, . . . , which are connected to the buses 40 and 50, are provided, for example, as a docking station (previously described).

The secondary PCI bus 40 is interconnected with the primary PCI bus 20 through the PCI to PCI bridge 21, as was previously described. The PCI to PCI bridge 21, the PCI devices 42, 43, . . . and the secondary PCI to ISA bridge 51 are connected to the secondary PCI bus 40. It should be noted that the PCI to PCI bridge 21 in this embodiment is designed for positive decoding on the secondary PCI bus 40.

The PCI devices 42, 43, . . . are devices for which fast input/output is required, such as a network sub-system connected via a PCMCIA controller or a LAN adaptor card, or a storage sub-system connected via a SCSI adaptor card. It should be noted that the PCI devices 42, 43, . . . sometimes serve as PCI masters (i.e., initiators) for obtaining access to other devices (including the secondary ISA devices), as needed.

The secondary PCI to ISA bridge 51 is a chip for interconnecting the secondary PCI bus 40 and the secondary ISA bus 50, and develops a transaction on one bus onto another bus, as needed. The PCI to ISA bridge 51 in this embodiment has the functions of a DMA controller, a programmable interrupt controller (PIC), and a programmable interval timer (PIT).

The secondary ISA devices 52, 53, . . . are connected to the secondary ISA bus 50. Examples of the ISA devices 52, 53, . . . are ISA expansion adaptor cards that are loaded into ISA bus slots. The ISA devices 52, 53, . . . can serve as slaves (i.e., targets) relative to the PCI master and access to them is requested, as needed. In this case, the bus transaction is performed by means of the secondary PCI to ISA bridge 51, which will be described later.

Figure 12:
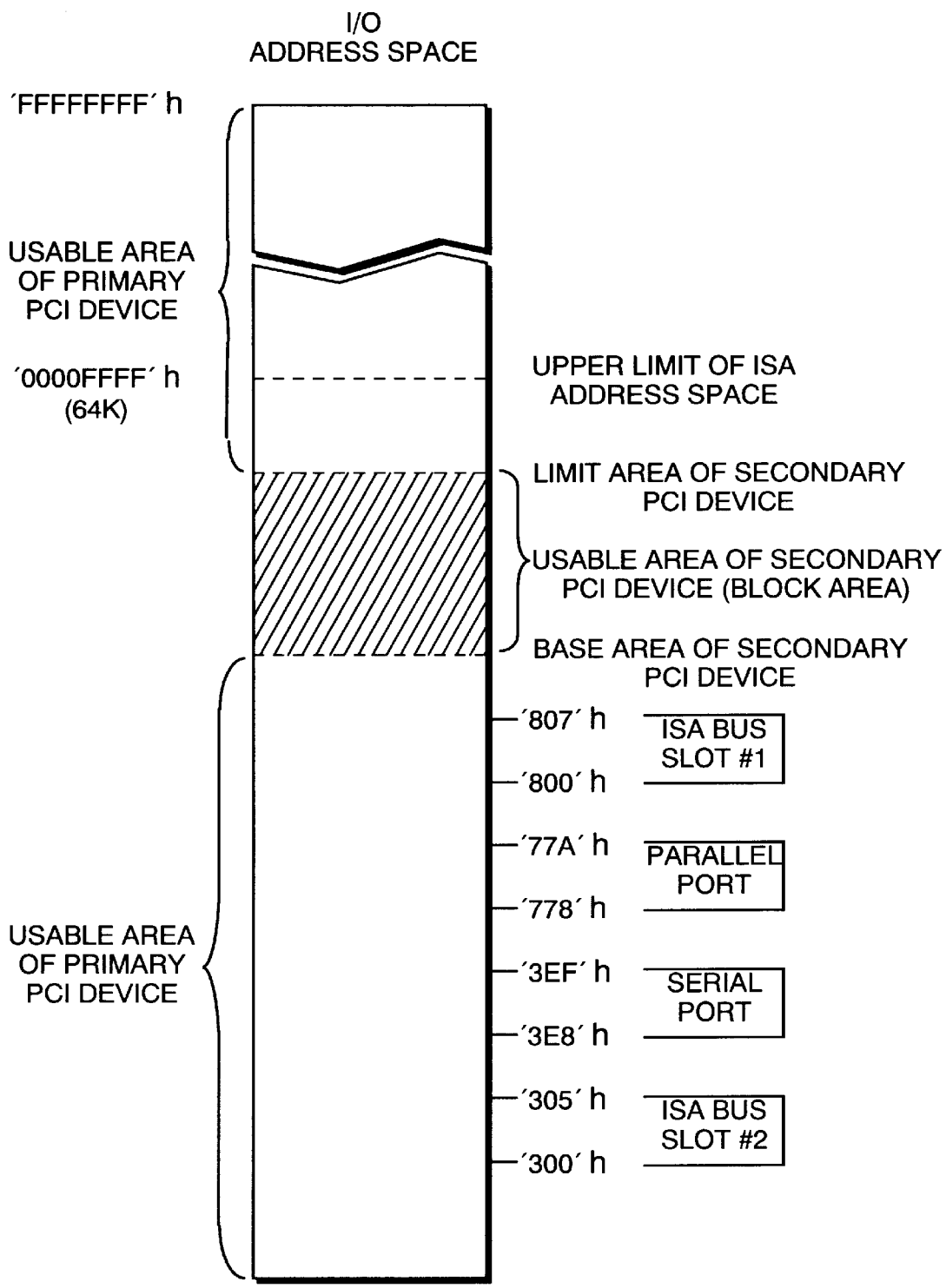
FIG. 12 is a schematic diagram showing the "Memory/IO Base/Limit Register" function of the PCI to PCI bridge using an I/O address map.
Figure 13:
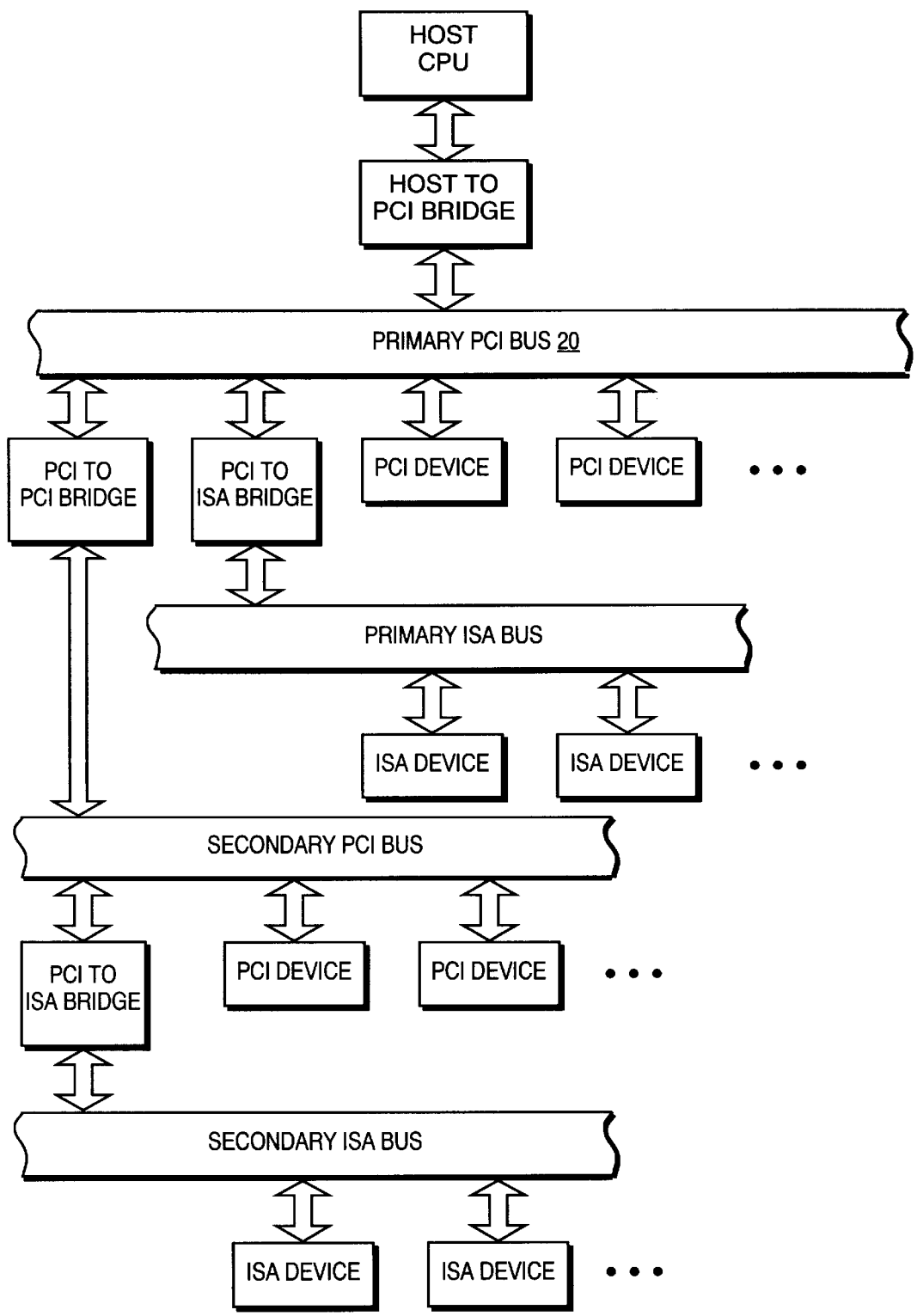
FIG. 13 is a schematic diagram illustrating the conventional hardware arrangement of a PC in which a PCI bus and an ISA bus coexist.
Figure 14:
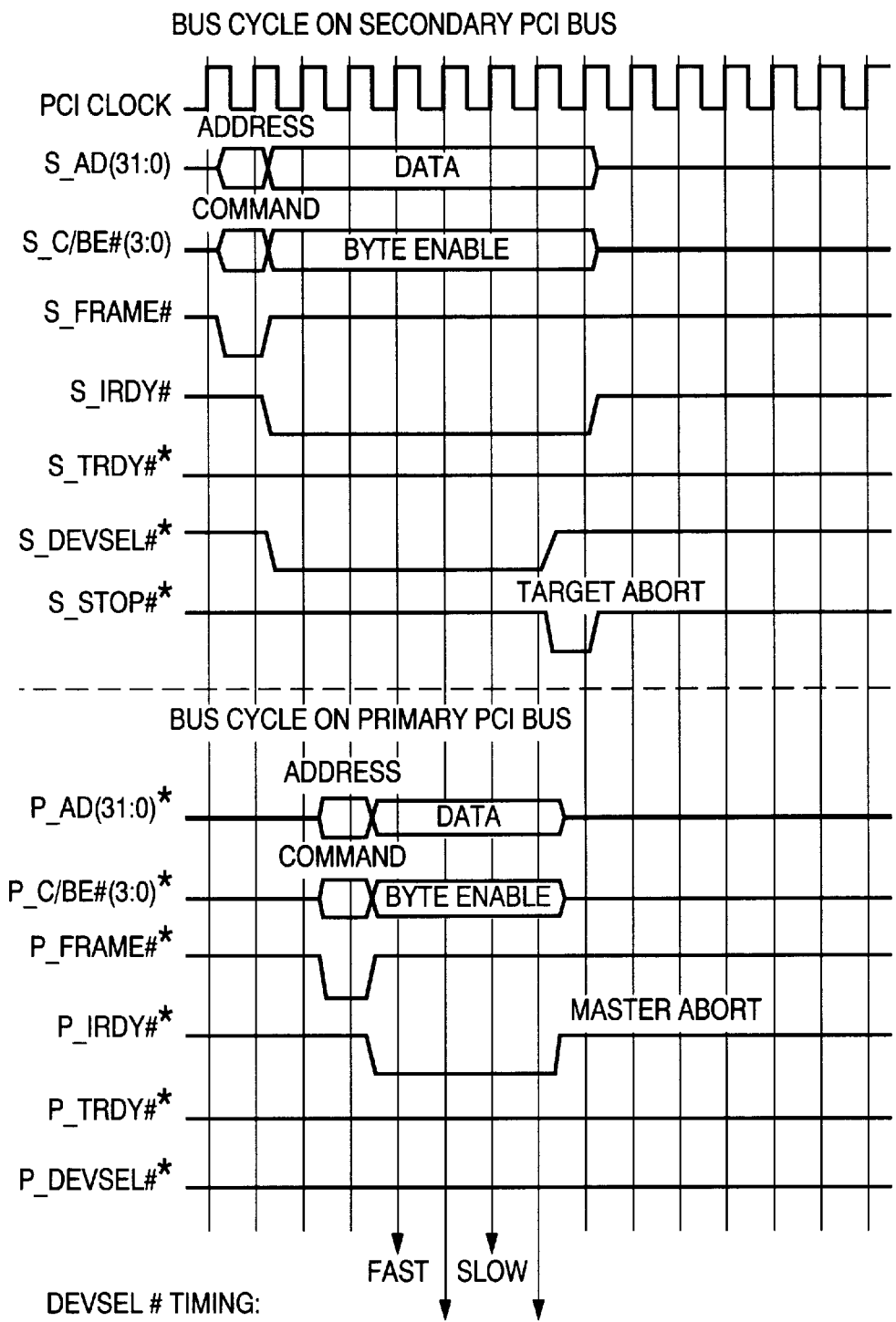
FIG. 14 is a timing chart showing conventional transactions on the primary and the secondary PCI buses when an access request is issued to the secondary ISA device by the secondary PCI device.

The secondary PCI to ISA bridge 51 in this embodiment adopts the subtractive decoding system. This is because the secondary PCI to ISA bridge 51 subtractively decodes only when none of the PnP PCI devices positively request a bus cycle, and provides a bus cycle for non-PnP ISA devices, as was previously described. In addition, since the secondary ISA devices 52, 53, . . . employ addresses outside a usable address space of the secondary PCI device (see FIG. 12), the secondary PCI to ISA bridge 51 is the only one secondary PCI device for performing decoding relative to the access of an space other than the usable address space of the secondary PCI device.

A user of the personal computer 100 operates the system by employing the keyboard 35 or the mouse 36, executes various applications, such as word processing, spread sheet and communication, and employs them on a display screen (i.e., a desktop) 23 while performing his or her work. One of the so-called personal computers currently being sold can serve satisfactorily as the computer system shown in FIG. 2. Many electric circuits other than those in FIG. 2 are required for constituting the computer system. But since these are well known to one having ordinary skill in the art and are not related to the subject of the present invention, no explanation for them will be given in this specification. To avoid complexity in the drawings, only partial connections between the hardware blocks are shown.

Figure 3:
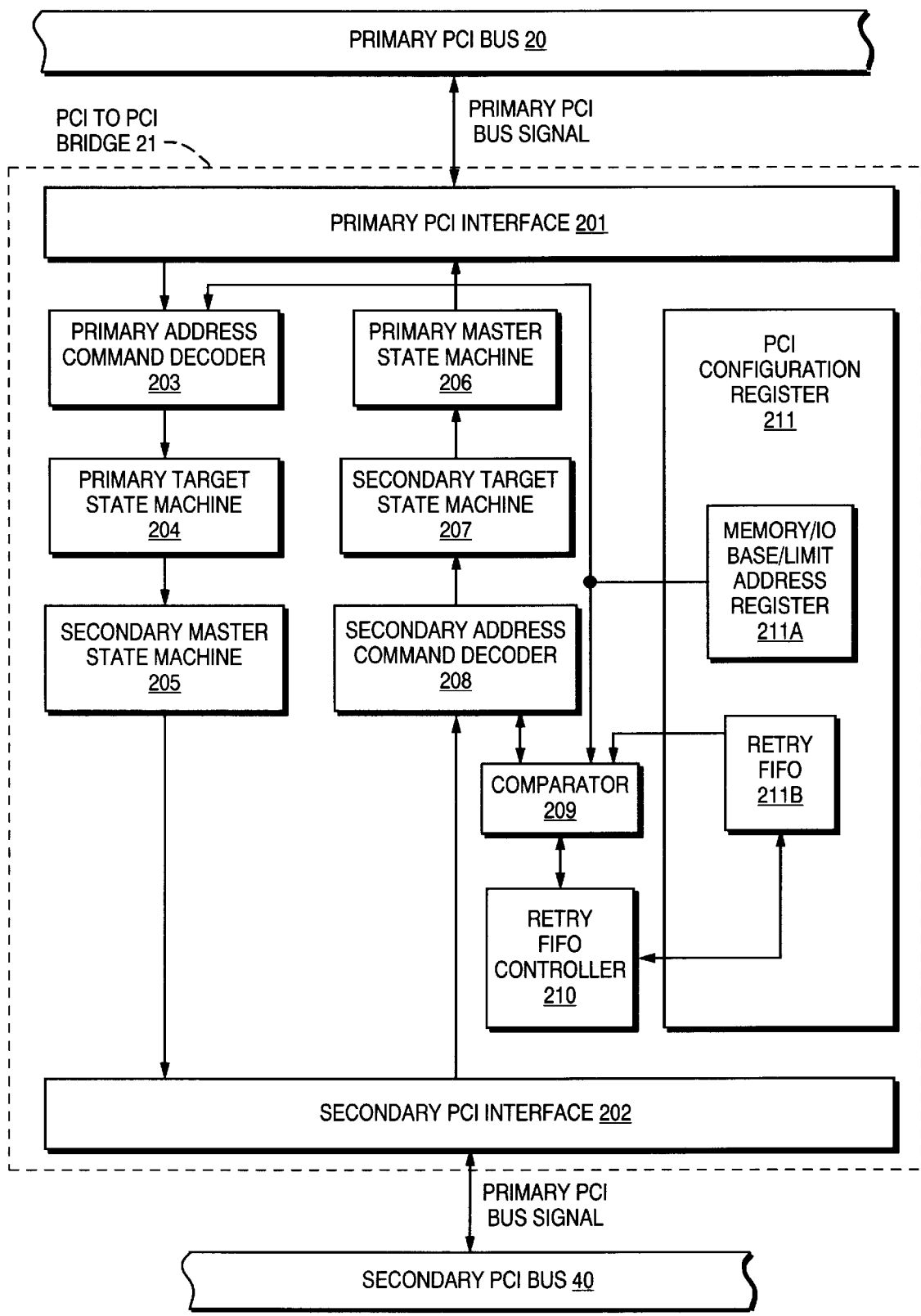
FIG. 3 is a schematic diagram illustrating the internal structure of a PCI to PCI bridge 21.

The present invention can be achieved by correcting or improving the structure and the operational characteristics of the PCI to PCI bridge 21. In this sub-division, the bridge chip 21 will now be explained in detail. FIG. 3 is a schematic diagram illustrating the internal structure of the PCI to PCI bridge 21. The respective sections will now be explained.

A primary PCI interface 201 and a secondary PCI interface 202 are circuits for performing data transfer between the primary PCI bus 20 and the secondary PCI bus 40. The interfaces 201 and 202 each include an I/O buffer (not shown) for temporarily holding addresses, data and commands transmitted to the buses 20 and 40.

A primary address command decoder 203, a primary target state machine 204, and a secondary master state machine 205 are components for developing a bus cycle on the primary PCI bus 20 onto the secondary PCI bus 40. More specifically, the decoder 203 interprets the address data and command data received by the interface 201, and determines whether or not a current transaction on the primary PCI bus 20 is an access to the secondary PCI device. If the decision of the decoder 203 is affirmative, the state machine 204 is activated as a target on the primary PCI bus 20, and the state machine 205 is activated as a master on the secondary PCI bus 40. The operation of the target state machine 204 is, for example, the assertion of a device selection signal (P_DEVSEL#) on the primary PCI bus 20; and the operation of the master state machine 205 is, for example, the assertion of a frame signal (S_FRAME#) on the secondary PCI bus 40. The primary address command decoder 203 in this embodiment performs subtractive decoding, as was previously described.

A secondary address command decoder 208, a secondary target state machine 207 and a primary master state machine 206 are components for developing a bus cycle on the secondary PCI bus 40 onto the primary PCI bus 20. More specifically, the decoder 208 interprets the address data and command data received by the interface 202, and determines whether or not a current transaction on the secondary PCI bus 40 is an access to the primary PCI device. If the decision of the decoder 208 is affirmative, the state machine 207 is activated as a target on the secondary PCI bus 40, and the state machine 206 is activated as a master on the primary PCI bus 20. The operation of the target state machine 207 is, for example, the assertion of a device selection signal (S_DEVSEL#) on the secondary PCI bus 40, and the operation of the master state machine 206 is, for example, the assertion of a frame signal (P_FRAME#) on the primary PCI bus 20. The secondary address command decoder 208 in this embodiment performs positive decoding, as was previously described.

A PCI configuration register 211, an comparator 209, and a retry FIFO controller 210 are components for cooperatively performing the decoding operation of the primary decoder 203 and the secondary decoder 208. The PCI configuration register 211 includes a memory/IO base/limit address register 211A and a retry FIFO 211B. As was explained while referring to FIG. 12 in the Background section (e.g., [0017] and [0018]), the memory/IO base/limit address register 211A defines a memory address space for use only as relates to the secondary PCI device, and an I/O address space (i.e., a "blocked area"), and stores base addresses and limit addresses of address spaces in a memory and for I/O. The primary decoder 203 refers only to the memory/IO base/limit address register 211A to determine whether the current transaction on the primary PCI bus 20 is an access request for the secondary PCI device. It should be understood that the memory/IO base/limit address register 211A constitutes a "first storage means" as hereinafter recited in the claims.

Figure 4:
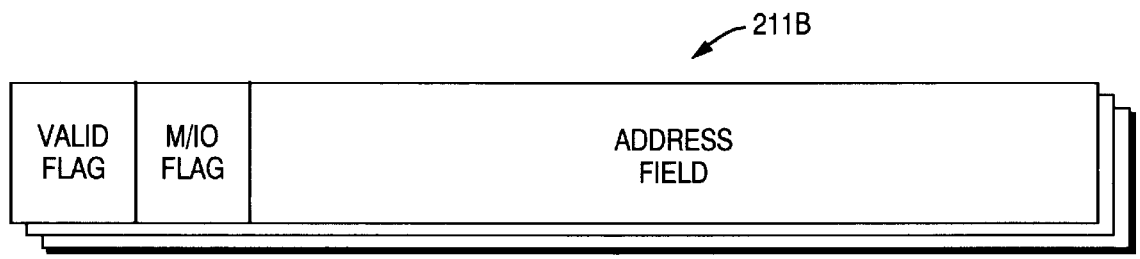
FIG. 4 is a detailed diagram illustrating the structure of a retry FIFO 211B in the PCI to PCI bridge 21.

The retry FIFO 211B is a buffer for temporarily storing address data concerning the transaction to be retried, and is a first-in and first-out system having a plurality of levels of buffers in this embodiment. FIG. 4 is a detailed diagram illustrating the structure of the retry FIFO 211B. In FIG. 4, the FIFO buffer 211B consists of four levels of buffers, and the increase and the decrease in the number of buffers constitutes merely a matter of design choice. The buffers each include an address field for storing address values, a valid flag indicating whether the currently stored data are valid or invalid, and an M/IO flag to indicate whether a stored address specifies a memory address or an I/O address. The length of the address field need only be 32 bits, taking the address width of the PCI bus into account. Only one bit is adequate for the valid flag and the M/IO flag. When the valid flag is 0, the data is invalid, and when the flag is 1, the data is valid. When the M/IO flag is 0, the address is an I/O address, and when the flag is 1, the address is a memory address. It should be understood that the retry FIFO 211B constitutes a "second storage means" as hereinafter recited in the claims.

The retry FIFO controller 210 is a hardware block for managing the data written in the retry FIFO 211B. When the PCI to PCI bridge 21 terminates a transaction on the secondary PCI bus 40 in a retry manner, the retry FIFO controller 210 writes address data concerning the transaction into an available buffer in the retry FIFO 211B. When all the buffers in the retry FIFO 211B are full, old data are abandoned to permit the input of new data.

The comparator 209 is a block for performing part of the decoding operation of the secondary address command decoder 208. More specifically, the comparator 209 compares a designated address on the secondary PCI bus 40 with the contents of the memory/I/O base/limit address register 211A. When the designated address is outside the address space (blocked area) that the secondary PCI device can use, the comparator 209 determines whether the address exists in the retry FIFO 211B. If the designated address does not exist in the retry FIFO 211B, the secondary decoder 208 determines that the access is for the primary PCI device, and decodes the transaction. If the designated address exists in the retry FIFO 211B, although the address is outside the address area that the secondary PCI device can use, the secondary decoder 208 determines the access is for the secondary PCI device, and does not decode the transaction.

Figure 5:
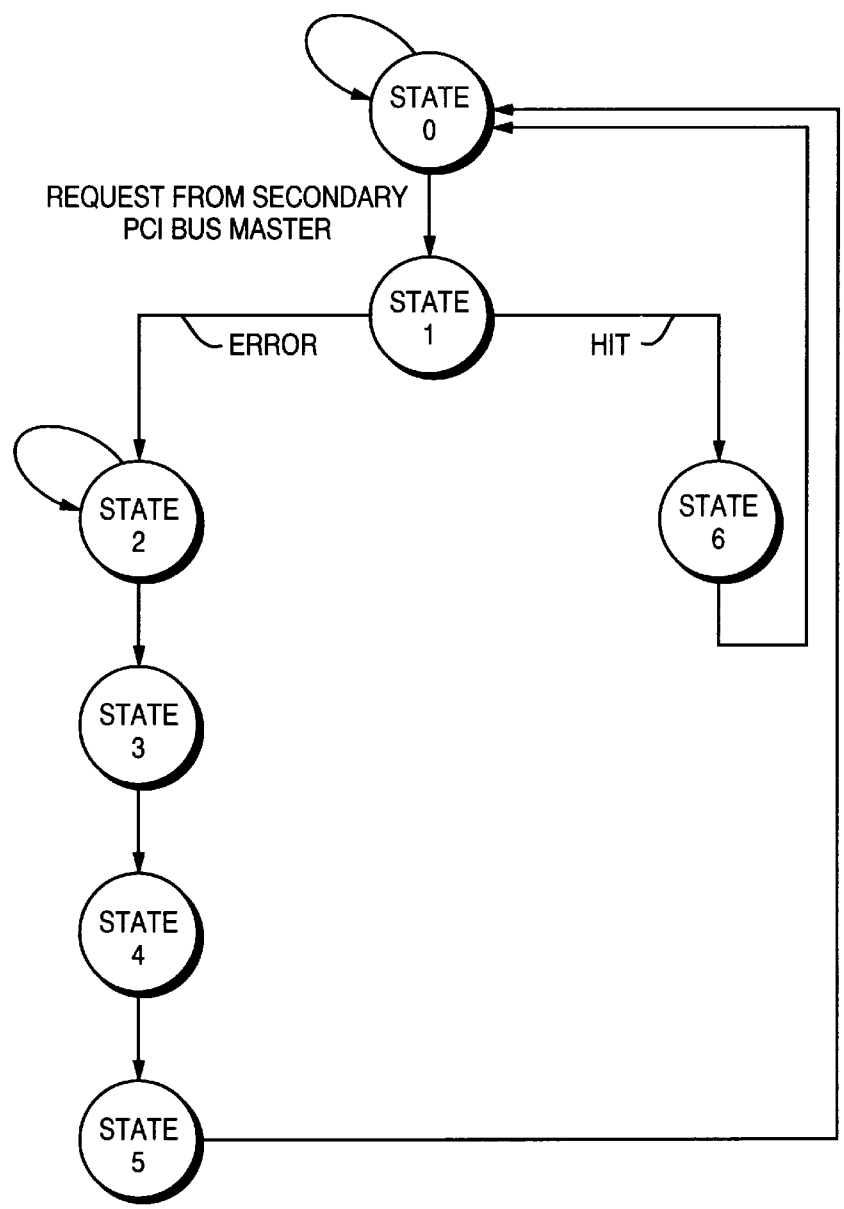
FIG. 5 is a diagram showing the state machine that describes the operational characteristic of the PCI to PCI bridge 21.

In FIG. 5, the operational features (particularly related to the subject of the present invention) of the PCI to PCI bridge 21 are illustrated using the state machine. The respective states will now be explained.

State 0

State 0 is the state when power is turned on and when an access request from the secondary PCI device is being awaited. The retry FIFO 211B when power is first turned on is empty.

State 1

When a transaction occurs at the secondary PCI device, the state is switched to state 1. In state 1, first, a check is performed to determine whether an address designated by the secondary PCI device is within a usable address space for the secondary PCI device that is defined by the memory/IO base/limit address register 211A. Then, a check is performed to determine whether the designated address exists in the retry FIFO 211B. If at least one of the two conditions is satisfied, the address is regarded as being an address hit, and the PCI to PCI bridge 21 advances to state 6. When none of the conditions is satisfied, the address is regarded as being an address error, and the state is changed to state 2.

State 2

State 2 is the address error state, i.e., where a bus cycle is determined to be the one for the primary PCI device. The PCI to PCI bridge 21 serves as a master device to cause the same transaction on the primary PCI bus 20. If one of the primary PCI devices decodes the transaction, the bus cycle is established. When the bus cycle is terminated, the state is returned to state 0. If none of the primary PCI devices decodes the transaction within a predetermined period, the state moves to state 3.

State 3

State 3 is the state where there is no primary PCI device that acknowledges a transaction that is caused by the PCI to PCI bridge 21. The PCI to PCI bridge 21 performs a master abort for the bus cycle on the primary PCI bus 20, and moves to state 4.

State 4

In this state, the PCI to PCI bridge 21 temporarily ends the bus cycle on the secondary PCI bus 40 in the retry manner, not in the target abort manner, and moves to state 5.

State 5

In this state, the PCI to PCI bridge 21 writes address data (an address value and an M/IO flag), which concerns the bus cycle that is to be retried, into the usable buffer in the retry FIFO 211B, thereafter validating the buffer. Then, the state is returned to the state 0, where the bus cycle that was temporarily terminated waits for a retry.

State 6

State 6 is the state of the address hit, i.e., where the bus cycle is determined to be the one for the secondary PCI devices (more specifically, an access to the secondary ISA device through the secondary PCI to ISA bridge 51). When the retry access is performed for the secondary ISA device, the address space that the secondary PCI device cannot use is employed. Since the PCI to PCI bridge does not positively decode it, the secondary PCI to ISA bridge 51 can subtractively decode the access, and the bus cycle is therefore established.

Access to secondary ISA device from secondary PCI device will now be detailed. The present invention is provided to preferably perform the fifth bus transaction in Table 1 (previously described), i.e., the access operation to the secondary ISA device by the secondary PCI device. In the foregoing paragraphs, the hardware environment of the computer system 100 according to the present invention has been described in detail. In this section, an explanation will be given for the access to the secondary ISA device by the secondary PCI device in the hardware environment.

Figure 6:
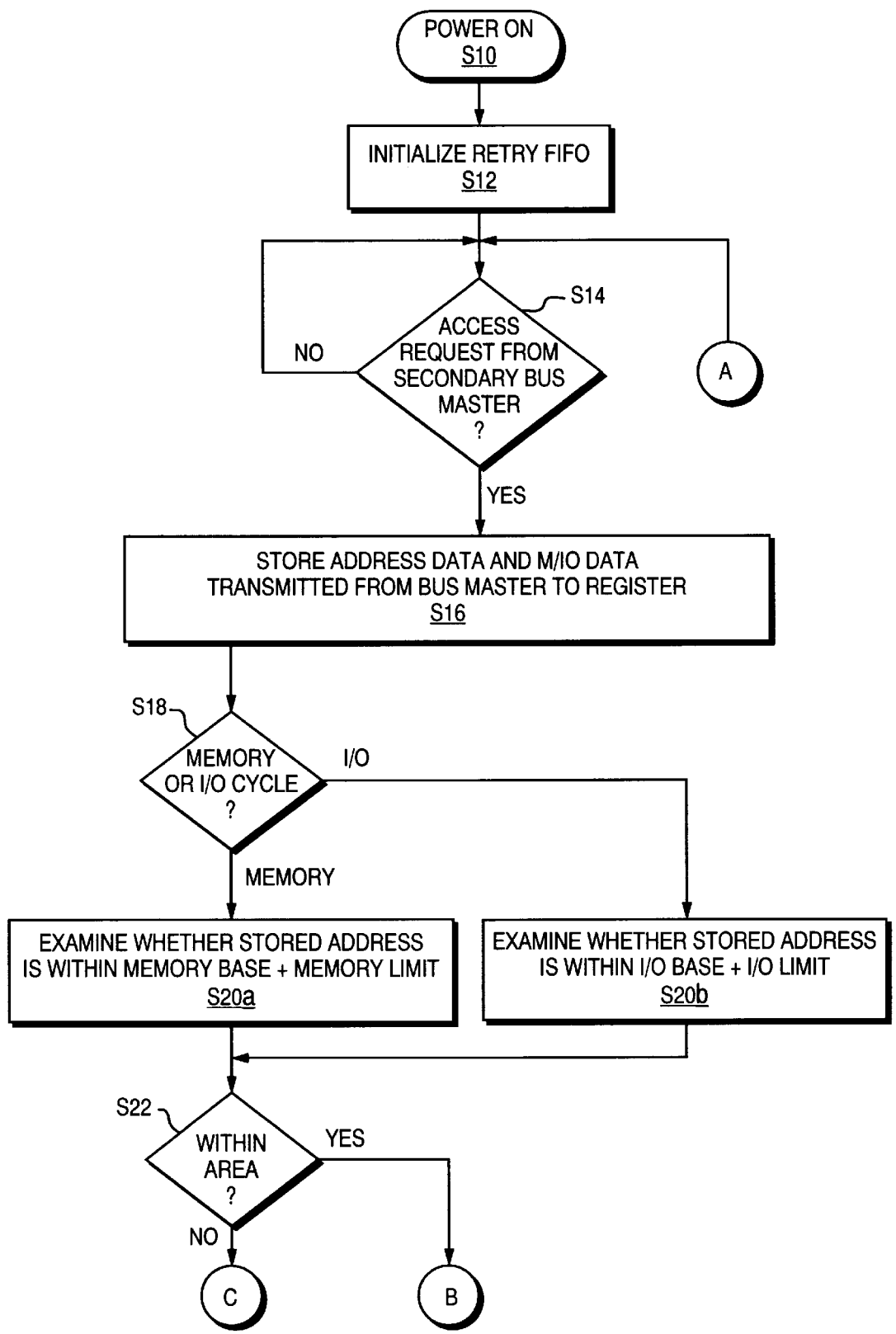
FIG. 6 is a flowchart (1) showing the operation of the PCI to PCI bridge 21 when a secondary ISA device is accessed by a secondary PCI device.
Figure 7:
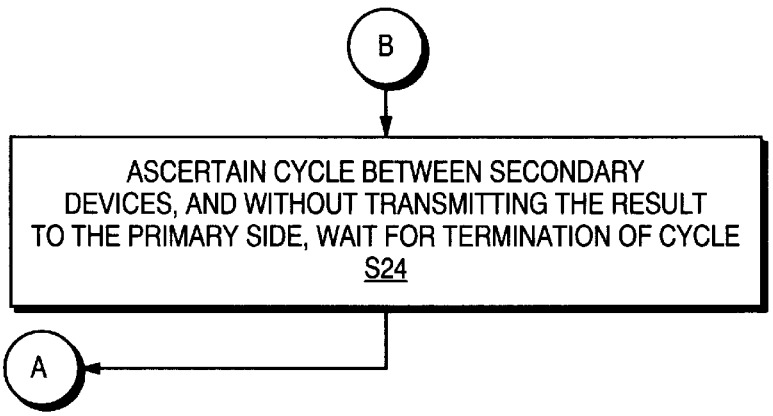
FIG. 7 is a flowchart (2) showing the operation of the PCI to PCI bridge 21 when the secondary ISA device is accessed by the secondary PCI device.
Figure 8:
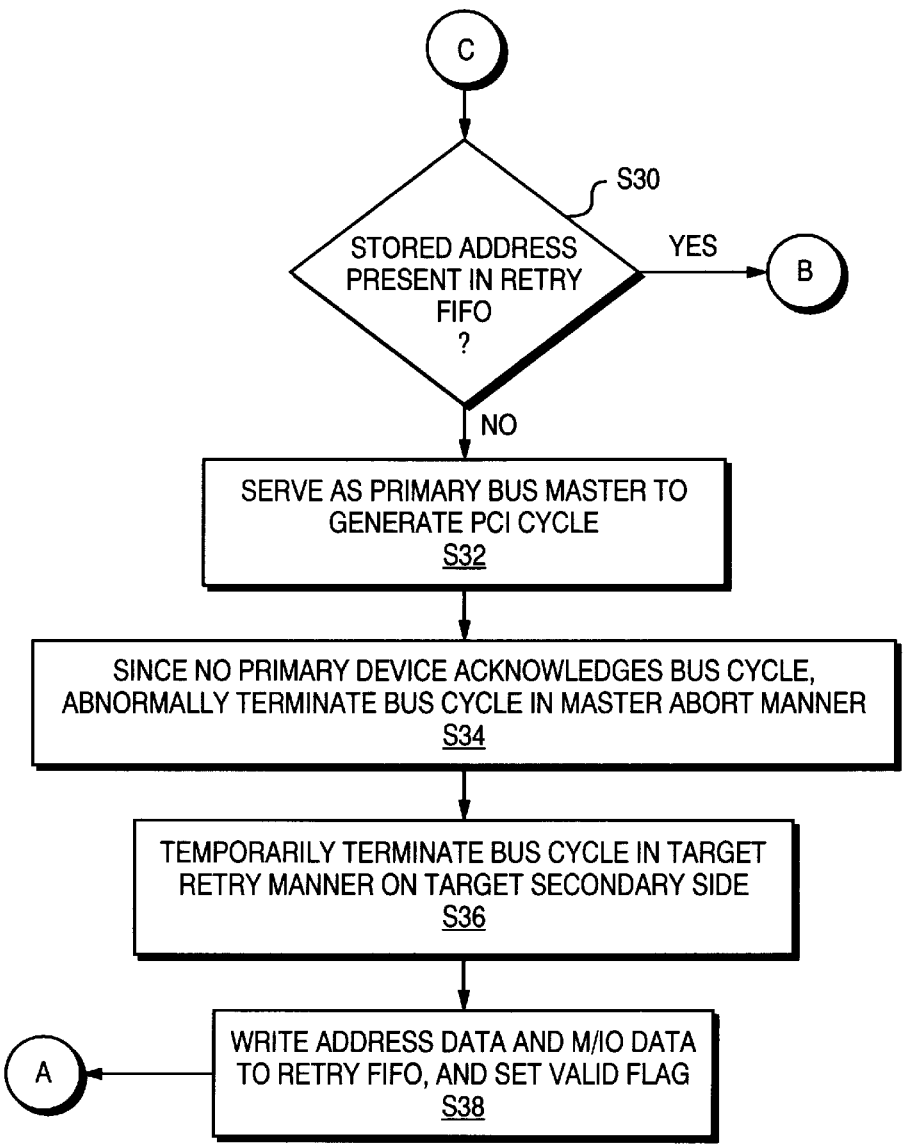
FIG. 8 is a flowchart (3) showing the operation of the PCI to PCI bridge 21 when the secondary ISA device is accessed by the secondary PCI device.

FIGS. 6 through 8 are flowcharts showing the operation of the PCI to PCI bridge 21 when the secondary ISA device (slave: supposed to be ISA device 52) is accessed by the secondary PCI device (master: supposed to be the PCI device 42). The operation will now be described while referring to FIGS. 6 through 8.

When the main power of the system 100 is turned on (step S10), a predetermined sequence, such as a self-diagnostic test or OS booting, is performed and then the system 100 is ready. In this condition, the retry FIFO 211B is initialized, i.e., empty (step S12). The PCI to PCI bridge 21 is in a waiting state until the transaction by the secondary PCI device is begun (step S14). Although the first and the second transactions in Table 1 are adequately performed by applying a well known logic, they are not directly related to the subject of the present invention, and will not be explained in detail.

When the transaction of the secondary PCI device is begun, the PCI to PCI bridge 21 temporarily stores, in the I/O buffer, address data and command data that are transmitted to the secondary PCI bus 40 (step S16). Then, a check is performed by employing the obtained command data to determine whether a current bus cycle is a memory cycle or an I/O cycle (step S18). When the current bus cycle is a memory cycle, a check is performed to determine whether or not the obtained address is within an address space defined by a memory base register value and a memory limit register value (step S20A). If the current bus cycle is an I/O cycle, a check is performed to determine whether or not the obtained address is within an address space defined by an I/O base register value and an I/O limit register value (step S20B). When, at steps S20A and S20B, the obtained address is within the address space defined by the base/limit register 211A, program control branches at step S22 to B. When the obtained address is outside the address space, program control branches at step S22 to C.

When the acquired address is within the address space defined by the base/limit register 211A, this means that a slave to which the access is requested is also the secondary PCI device. Therefore, the PCI to PCI bridge 21 does not transmit the transaction on the secondary PCI bus 40 to the primary PCI bus 20, and only waits for the termination of the transaction on the secondary PCI bus 40 (step S24). When the transaction is completed, program control returns to step S14, and the above process is repeated.

When the obtained address is outside the address space defined by the base/limit register 211A, first, a check is performed to determine whether or not the address exists in the retry FIFO 211B (step S30). If the obtained address exists in the retry FIFO 211B, this means it is for a retry of the access to the secondary ISA device that failed before, and program control thus moves to step S24. The PCI to PCI bridge 21 does not positively decode the transaction and waits for the completion of the transaction on the secondary PCI bus 40. As a result, the secondary PCI to ISA bridge 51 can subtractively decode the transaction and can acquire a bus cycle. The transaction on the secondary PCI bus 40 is developed onto the secondary ISA bus 50, and the access of the secondary ISA bus, for which access is actually requested, is performed. When the transaction is completed, program control returns to step S14, and the above process is repeated.

If the acquired address does not exist in the retry FIFO 211B, the PCI to PCI bridge 21 determines the access is to the primary PCI bus 20. The PCI to PCI bridge 21 then positively decodes the transaction, and transmits the bus cycle on the secondary PCI bus 40 to the primary PCI bus 20 (step S32). Because of the positive decoding of the PCI to PCI bridge 21, the secondary PCI to ISA bridge 51 may miss the opportunity for subtractive decoding.

If the bus cycle transmitted to the primary PCI bus 20 is the one for requesting access to the primary PCI device, the transaction will succeed because of positive decoding of a corresponding device on the primary PCI bus 20. However, when, although the bus cycle actually requests access to the secondary ISA device, the PCI to PCI bridge 21 mistakes it for a request to access the primary PCI device because the address is outside the address space defined by the base/limit register 211A, no device that acknowledges the request is on the primary PCI bus 20 accordingly. In this case, the PCI to PCI bridge 21, which serves as a master device on the primary PCI bus 20, has to abnormally terminate the transaction in the master abort manner (step S34). It should be noted that, for this type of master abort, only the secondary PCI to ISA bridge from among the secondary PCI devices must acknowledge the access to an area other than the blocked area.

In this embodiment, on the secondary PCI bus 40, where the PCI to PCI bridge 21 serves as a target, the PCI to PCI bridge 21 temporarily terminates the transaction in the retry manner, not in the target abort manner (step S36). In addition, the PCI to PCI bridge 21 writes the address data and command data (i.e., a memory cycle or an I/O cycle) concerning the current transaction into the fields of a usable buffer in the retry FIFO 211B, and sets the valid flag in the buffer (step S38). Program control thereafter returns to step S14.

In response to the completion of the bus cycle in the retry manner, the master secondary PCI device retries the same transaction. In this case, since the designated address exists in the retry FIFO 211B, program control branches at step S30 to "Y," and the transaction succeeds.

Figure 9:
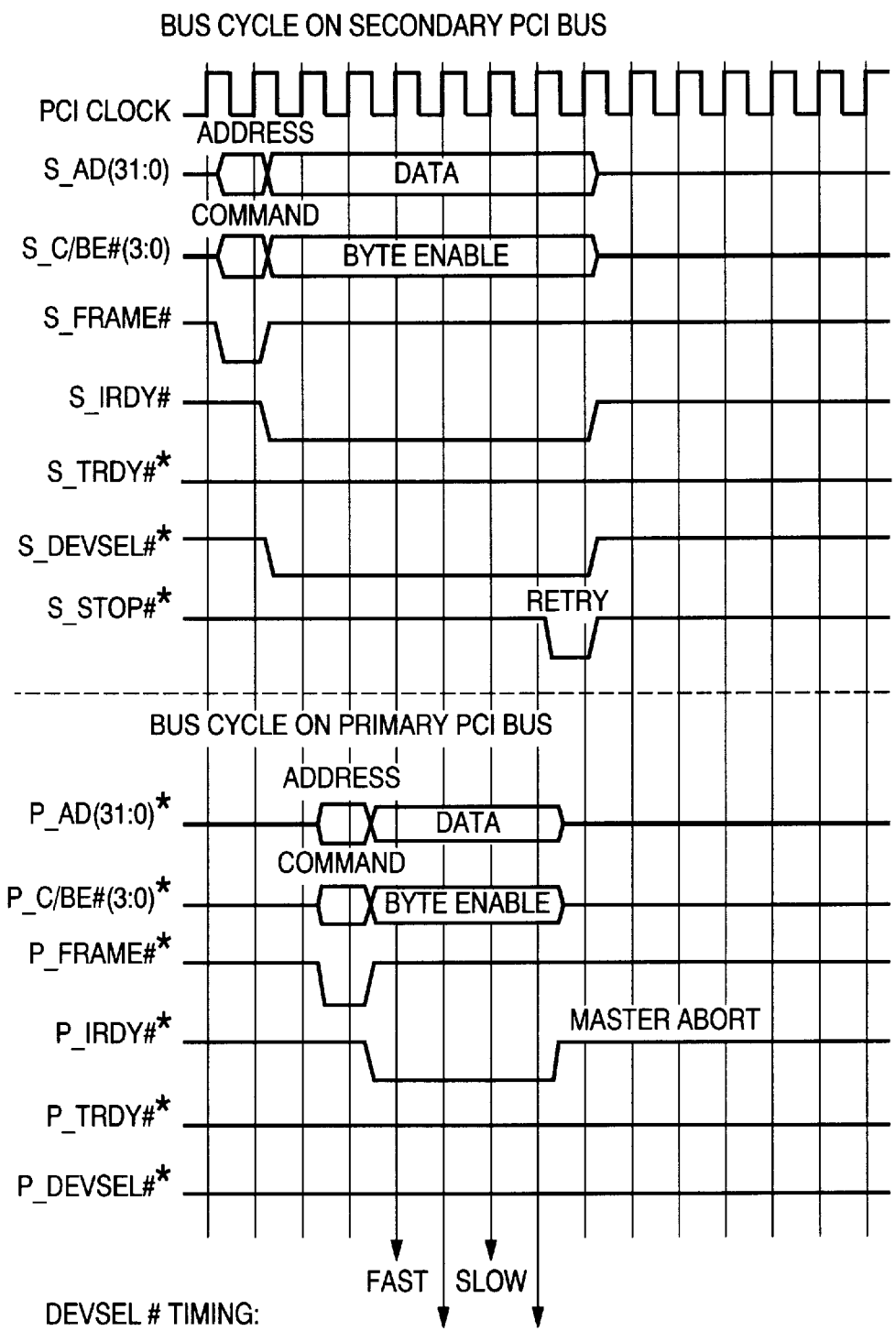
FIG. 9 is a time chart showing the transactions on PCI buses 20 and 40 when the secondary ISA device is accessed by the secondary PCI device.
Figure 10:
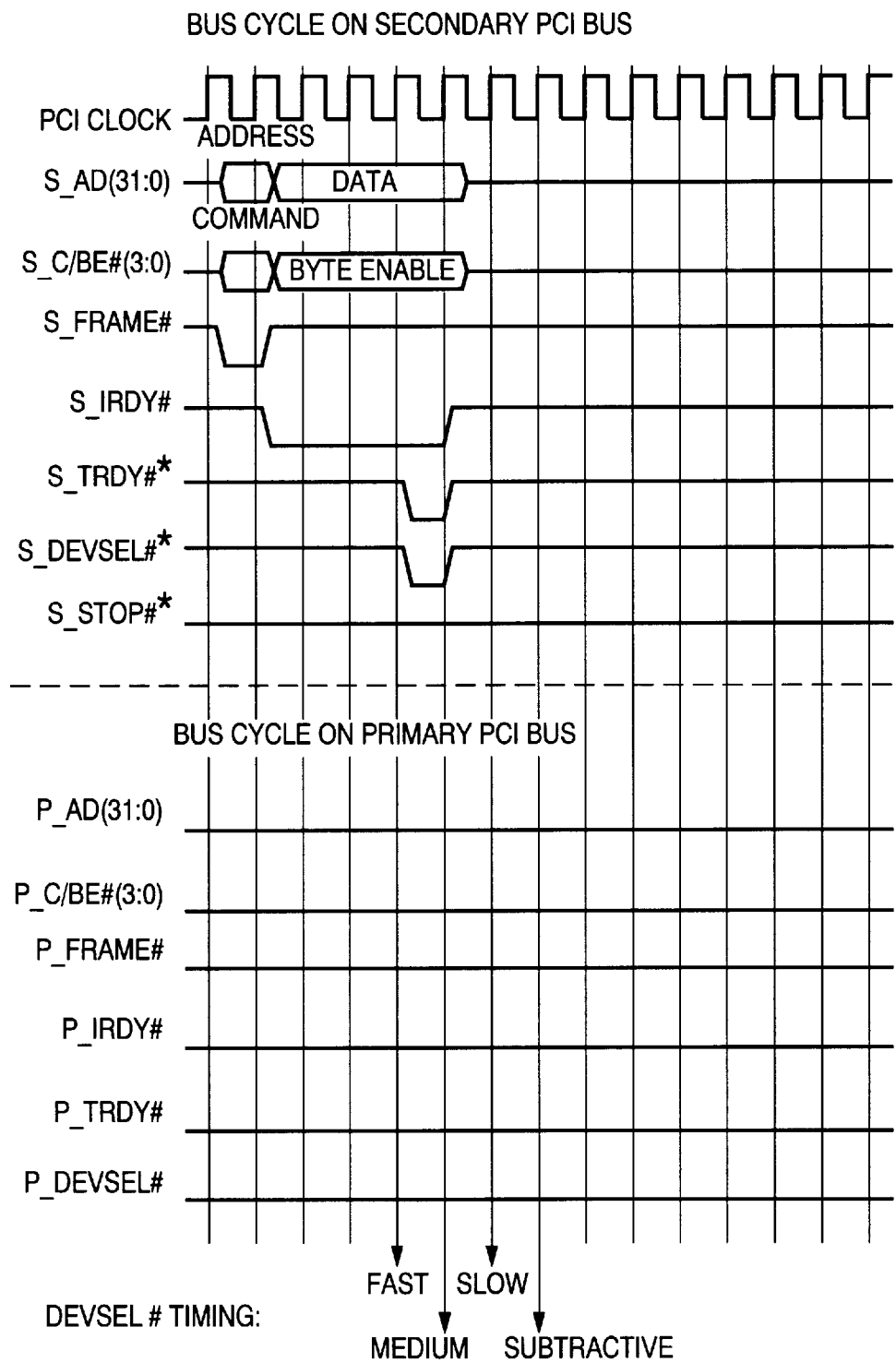
FIG. 10 is a time chart showing the transactions on PCI buses 20 and 40 when the secondary ISA device is accessed by the secondary PCI device.
Figure 11:
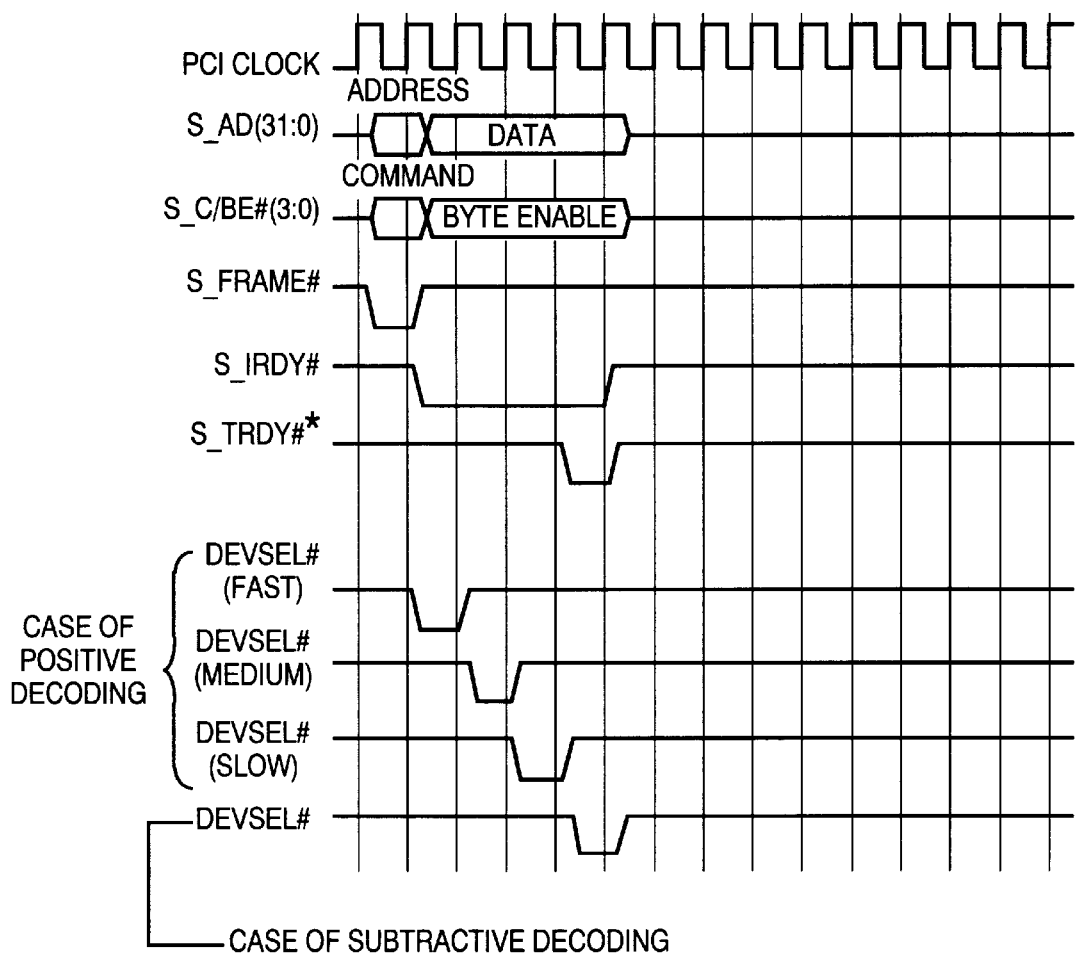
FIG. 11 is a timing chart showing the transactions (during the single write operation) on a subtractive decoding PCI bus.

FIGS. 9 and 10 are time charts showing the transactions in the PCI buses 20 and 40 when the secondary ISA device (e.g., the ISA device 52) is accessed from the secondary PCI device (e.g., the PCI device 42). In FIGS. 9 and 10, prefix "P_" indicates a signal line in the primary PCI bus, and prefix "S_" indicates a signal line in the secondary PCI bus. Signal lines with a superscript "*" added as a suffix in FIG.

9 are to be asserted by the PCI to PCI bridge 21. Signal lines with a superscript "*" added as a suffix in FIG. 10 are to be asserted by the secondary PCI to ISA bridge 51. The operation will now be described while referring to the timing charts.

First, in FIG. 9, the master secondary PCI device 42 declares the initiation of a transaction by asserting signal S_FRAME#. The PCI device 42 transmits an address to S_AD [31:0] and a command to S_C/BE# [3:0]. This address is outside the usable address space for the secondary PCI device defined by the register 211A. When the PCI device 42 is ready for data transfer, the PCI device 42 asserts S_IRDY#, and transmits data to S_AD [31:0] and a byte enable value to S_C/BE# [3:0].

Since the designated address is outside the usable address space for the secondary PCI device, the PCI to PCI bridge 21 ascertains that the transaction is an access request to the primary PCI device. The PCI to PCI bridge 21 serves as a target on the secondary PCI bus 40, and asserts S_DEVSEL# and requests a bus cycle. Further, on the primary PCI bus 20, the PCI to PCI bridge 21 serves as a master or an initiator and generates the same bus cycle. That is, the PCI to PCI bridge 21 asserts P_FRAME# to initiate a transaction. Also, when the PCI to PCI bridge 21 is ready for data transfer, it asserts P_IRDY# and transmits the same address/data and the same command/byte enable value to P_AD [31:0] and P_C/BE# [3:0].

However, the PCI to PCI bridge 21 mistakes the transaction for an access request to the primary PCI device, and the actual target is the secondary PCI to ISA bridge 51 which communicates with the secondary ISA device 52 to be accessed. In other words, there is no slave device on the primary PCI bus 20 to acknowledge the transaction. And therefore, after a predetermined period of time has elapsed, the PCI to PCI bridge 21 has to terminate the bus cycle on the primary PCI bus 20 in the master abort manner. On the secondary PCI bus 40 where the PCI to PCI bridge 21 serves as a target, the PCI to PCI bridge 21 temporarily terminates the bus cycle in the retry manner, not in the target abort manner. Further, the PCI to PCI bridge 21 writes address data concerning the retry bus cycle to the fields of a usable buffer in the retry FIFO 211B.

Referring to FIG. 10, the master secondary PCI device 42 that receives a retry asserts S_FRAME# for the transaction to be retried. The PCI device 42 transmits the same address and command as before to S_AD [31:0] and S_C/BE# [3:0]. When the PCI device 42 is ready for data transfer, the PCI device 42 asserts S_IRDY#, and transmits data and a byte enable value to S_AD [31:0] and S_C/BE# [3:0].

Although the designated address is outside the usable address space for the secondary PCI device, since the same address exists in the retry FIFO 211B, the PCI to PCI bridge 21 ascertains that the transaction is not an access request to the primary PCI device, and does not decode the transaction. Since no other secondary PCI devices positively decode the transaction, an opportunity for subtractive decoding is provided for the secondary PCI to ISA bridge 51. In other words, the secondary PCI to ISA bridge 51 asserts S_DEVSEL# at a subtractive timing, and requests a bus cycle.

The secondary PCI to ISA bridge 51, which has acquired the bus cycle further assets S_TRDY#, converts the bus cycle in order to transmit the converted bus cycle to the secondary ISA bus 50. As a result, the transaction is transmitted to the target secondary ISA device 52, and the data transfer can be performed with no problems between the master secondary PCI device 42 and the slave secondary ISA device 52.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the accompanying claims should be referred to.

What is claimed is:

1. A method for transferring data between buses, in a data processing system that has a first bus, a second bus interconnected with said first bus through a first bridge device, and a third bus interconnected with said second bus through a second bridge device, with devices on said second bus using addresses within a predetermined address space and devices on the other buses using addresses outside said predetermined address area, comprising the steps of:
    (a) a device on said second bus issuing a request to access a device on said third bus;
    (b) said first bridge device acknowledging and transmitting said access request to said first bus;
    (c) said first bridge device, when no acknowledgement of said access request is issued by any device on said first bus, storing an address of a device to be accessed and terminating said access request;
    (d) said device on said second bus retrying said access request;
    (e) said first bridge device comparing an address of a device to be accessed to said stored address and ignoring said access request when said addresses match; and
    (f) said second bridge device, when no acknowledgement of said access request is issued by any device on said second bus, acknowledging and transmitting said access request to said third bus.

2. A method for transferring data between buses, in a data processing system that includes a primary PCI bus serving as a local bus for a host CPU, a secondary PCI bus interconnected with said primary PCI bus through a PCI to PCI bridge, and a secondary ISA bus interconnected with said secondary PCI bus through a PCI to ISA bridge, at least one secondary PCI device on said secondary PCI bus using an address within a predetermined address space and at least one primary PCI device on said primary PCI bus and at least one secondary ISA device on said secondary ISA bus using addresses outside said predetermined address space, comprising the steps of:
    (a) a secondary PCI device asserting a frame signal for said secondary PCI bus to initiate an access request for said secondary ISA device;
    (b) said PCI to PCI bridge asserting a device selection signal among said secondary PCI bus to acknowledge said access request, and initiating said access request on said primary PCI bus;
    (c) said PCI to PCI bridge storing a requested address and terminating said access request when no primary PCI device asserts a device selection signal within a predetermined period of time;
    (d) said secondary PCI device terminating said access request by a retry;
    (e) said PCI to PCI bridge comparing an address to be accessed to said stored address and determining that no device selection signal will be generated on said secondary PCI bus when said addresses match; and
    (f) said PCI to ISA bridge asserting a device selection signal on said secondary PCI bus to acknowledge said access request and initiating said access request on said secondary ISA bus.

3. The method for transferring data between buses according to claim 2, wherein said PCI to PCI bridge asserting a device selection signal comprises positively asserting a device selection signal on said secondary PCI bus.

4. The method for transferring data between buses according to claim 2, wherein said terminating by said PCI to PCI bridge comprises terminating the bus cycle by a master abort on said primary PCI bus, and terminates the bus cycle by a retry on said secondary PCI bus.

5. The method for transferring data between buses according to claim 2, wherein said asserting by said PCI to ISA bridge comprises subtractively asserting a device selection signal along said secondary PCI bus.

6. A method for transferring data between buses, in a data processing system that includes a primary PCI bus serving as a local bus of a host CPU and a secondary PCI bus interconnected with said primary PCI bus through a PCI to PCI bridge that connects said PCI buses, at least one positive secondary PCI device on said secondary PCI bus using an address within a predetermined address space and at least one primary PCI device on said primary PCI bus and a subtractive secondary PCI device using addresses outside said predetermined address space, comprising the steps of:

(a) a first secondary PCI device asserting a frame signal for said secondary PCI bus to initiate an access request for a second secondary PCI device;

(b) said PCI to PCI bridge positively asserting a device selection signal on said secondary PCI bus, and initiating said access request on said primary PCI bus;

(c) said PCI to PCI bridge, when no primary PCI device asserts a device selection signal on said primary PCI bus within a predetermined period of time, storing a requested address and terminating a transaction on said secondary PCI bus in a retry step;

(d) said first secondary PCI device, in response to said retry step, retrying said access request;

(e) said PCI to PCI bridge comparing said requested address to said stored address, and determining that a device selection signal will not be positively asserted on said secondary PCI bus when said addresses match; and (f) said second secondary PCI device subtractively asserting a device selection signal on said secondary PCI bus when none of the other secondary PCI devices positively asserts a device selection signal.

7. A bridge device for interconnecting a primary PCI bus that serves as a local bus for a host CPU and a secondary PCI bus, comprising:

(a) first storing means for storing an address space that only a secondary PCI device connected to said secondary PCI bus is allowed to use;

(b) second storing means for storing address information of a bus cycle that said bridge device terminates;

(c) primary decoding means for decoding an address hit when a requested address is within the address space defined by said first storing means;

(d) first transmitting means for, in response to said address hit decoded by said primary decoding means, transmitting a bus cycle on said primary PCI bus to said secondary PCI bus;

(e) secondary decoding means for decoding an address hit only when a requested address is outside said address space defined by said first storing means and that does not exist in said second storing means; and (f) second transmitting means for, in response to said address hit decoded by said secondary decoding means, transmitting a bus cycle on said secondary PCI bus to said primary PCI bus.

8. The bridge device for interconnecting buses according to claim 7, wherein said primary decoding means subtractively decodes an address hit and said secondary decoding means positively decodes an address hit.

9. A data processing system including a primary PCI bus that serves as a local bus for a host CPU and a secondary PCI bus, wherein said primary PCI bus is interconnected with said secondary PCI bus by means of said bridge device comprising:

first storing means for storing an address space that only a secondary PCI device connected to said secondary PCI bus is allowed to use;

second storing means for storing address information of a bus cycle that said bridge device terminates;

primary decoding means for decoding an address hit when a requested address is within the address space defined by said first storing means;

first transmitting means for, in response to said address hit decoded by said primary decoding means, transmitting a bus cycle on said primary PCI bus to said secondary PCI bus;

secondary decoding means for decoding an address hit only when a requested address is outside said address space defined by said first storing means and that does not exist in said second storing means; and second transmitting means for, in response to said address hit decoded by said secondary decoding means, transmitting a bus cycle on said secondary PCI bus to said primary PCI bus.

10. A data processing system having multiple buses comprising:

(a) a main processor for totally controlling and managing the operation of said system;

(b) a main memory;

(c) a primary PCI bus provided as a local bus for said main processor;

(d) at least one primary PCI device connected to said primary PCI bus;

(e) a secondary PCI bus;

(f) a bridge device comprising first storing means for storing an address space that only a secondary PCI device connected to said secondary PCI bus is allowed to use; second storing means for storing address information of a bus cycle that said bridge device terminates; primary decoding means for decoding an address hit when a requested address is within the address space defined by said first storing means; first transmitting means for, in response to said address hit decoded by said primary decoding means, transmitting a bus cycle on said primary PCI bus to said secondary PCI bus; secondary decoding means for decoding an address hit only when a requested address is outside said address space defined by said first storing means and that does not exist in said second storing means; and second transmitting means for, in response to said address hit decoded by said secondary decoding means, transmitting a bus cycle on said secondary PCI bus to said primary PCI bus for interconnecting said primary PCI bus with said secondary PCI bus; and (g) at least one secondary PCI device connected to said secondary PCI bus.

11. A data processing system having multiple buses comprising:
- (a) a main processor for totally controlling and managing the operation of said system;
- (b) a main memory;
- (c) a primary PCI bus provided as a local bus for said main processor;
- (d) at least one primary PCI device connected to said primary PCI bus;
- (e) a secondary PCI bus;
- (f) a PCI to PCI bridge, for interconnecting said secondary PCI bus with said primary PCI bus, including decoding means for positively decoding on said secondary PCI bus and decode inhibiting means for, when said PCI to PCI bus terminates a bus cycle in a retry step, inhibiting decoding of the same bus cycle that was retried;
- (g) at least one positive decoding secondary PCI device connected to said secondary PCI bus; and
- (h) one subtractive decoding secondary PCI device connected to said secondary PCI bus.

12. The data processing system having multiple buses according to claim 11, wherein said subtractive decoding secondary PCI device is a PCI to ISA bridge for connecting an ISA bus to said secondary PCI bus.

* * * * *